(12) United States Patent
Kurata

(10) Patent No.: US 8,446,957 B2
(45) Date of Patent: May 21, 2013

(54) IMAGE PROCESSING APPARATUS AND METHOD USING EXTENDED AFFINE TRANSFORMATIONS FOR MOTION ESTIMATION

(75) Inventor: Tohru Kurata, Saitama (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 12/413,755

(22) Filed: Mar. 30, 2009

(65) Prior Publication Data
US 2009/0257498 A1 Oct. 15, 2009

(30) Foreign Application Priority Data
Apr. 15, 2008 (JP) ................................. 2008-105248

(51) Int. Cl.
*H04N 7/12* (2006.01)
(52) U.S. Cl.
USPC .................................................. 375/240.16
(58) Field of Classification Search
USPC . 375/130–153, 240.01–240.29; 704/500–504
IPC ......... H04N 7/12,11/04, 7/24, 7/26; H04B 1/66
See application file for complete search history.

(56) References Cited

U.S. PATENT DOCUMENTS

| 2004/0027454 | A1* | 2/2004 | Vella et al. ..................... 348/155 |
| 2004/0252759 | A1* | 12/2004 | Winder et al. ............ 375/240.12 |
| 2005/0259739 | A1* | 11/2005 | Nakamura et al. ....... 375/240.16 |
| 2006/0222260 | A1* | 10/2006 | Sambongi et al. ............ 382/274 |
| 2007/0183505 | A1* | 8/2007 | Shimizu et al. .......... 375/240.16 |

FOREIGN PATENT DOCUMENTS

| JP | 04-003595 | 1/1992 |
| JP | 2007-174455 | 7/2005 |
| JP | 2005-321902 | 11/2005 |
| JP | 2006-287504 | 10/2006 |
| JP | 2007-221631 | 8/2007 |
| JP | 2007-181168 | 12/2007 |
| WO | 99/21135 | 4/1999 |

OTHER PUBLICATIONS

Dufaux et al., "Efficient, Robust, and Fast Global Motion Estimation for Video Coding", IEEE Transactions on Image Processing, IEEE Service Center, Mar. 1, 2000, pp. 397-399, vol. 9, No. 3.
Lee et al., "Moving Target Tracking Algorithm Based on the Confidence Measure of Motion Vectors", Int. Conf. on Image Processing, Oct. 7, 2001, pp. 369-371, vol. 1.
Smolic et al., "Low-Complexity Global Motion Estimation from P-Frame Motion Vectors for MPEG-7 Applications", Int. Conference on Image Processing, Sep. 10-13, 2000, pp. 271-273, vol. 2.

(Continued)

*Primary Examiner* — Richard Torrente
(74) *Attorney, Agent, or Firm* — K&L Gates LLP

(57) ABSTRACT

An image processing apparatus includes: motion vector detection section configured to detect a motion vector of each of a plurality of blocks of a predetermined size set in an image and formed from a plurality of pixels; and global motion calculation section configured to carry out convergence mathematical operation, from the motion vectors of the blocks detected by the motion vector detection section, using extended affine transformation in which at least one of affine parameters is represented by a function of a variable regarding a displacement axis of the image to calculate a global motion representative of deformation applied to the entire image.

23 Claims, 30 Drawing Sheets

OTHER PUBLICATIONS

Zheng et al., "Hierarchical Threshold Technique Oriented to Video Object Segmentation", Intelligent Signal Processing and Communication Systems, Nov. 1, 2007, pp. 858-861.
European Search Report dated Dec. 15, 2010, corresponding to European Appln. No. 09004732.5.
Japanese Office Action issued on Mar. 2, 2010, for corresponding JP2008-105248.
Chan et al., "Improved Global Motion Estimation Using Prediction and Early Termination", IEEE International Conference on Image Processing, Sep. 22, 2002, vol. 2, pp. 285-287.
Etoh, "Promotion of Block Matching: Parameteric Representation for Motion Estimation", International Conference on Pattern Recognition, Aug. 16, 1998, vol. 1, pp. 282-285.
Muller, "Report of the Ad Hoc Group on Core Experiments on Efficient Coding in MPEG-4 Video", International Organization for Standardization, Mar. 1996, pp. 1-139.
Odobez et al., "Robust Multiresolution estimation of parametric motion models", International Journal of Visual Communication and Image Representation, Dec. 1995, vol. 6, No. 4, pp. 348-365.
Patras, "Confidence Measures for Block Matching Motion Estimation", International Conference on Image Processing, Sep. 22, 2002, vol. 2, pp. 277-280.
Stiller et al., "Estimating Motion in Image Sequences", Signal Processing Magazine, Jul. 1, 1999, pp. 70-91.
Stoller et al., An Image Processing Board with an MPEG Processor and Additional Confidence Calculation for Fast and Robust Optic Flow Generation in Real Environments, International Conference on Advanced Robotics, Jul. 7, 1997, pp. 845-850.
Wallin et al., Robust Mosaic construction algorithm, International Organization for Standarization, Mar. 6, 2000, pp. 1-15.
Zheng et al., "Adaptive Selection of Motion Models for Panoramic Video Coding", International Conference on Multimedia and Expo, Jul. 1, 2007, pp. 1319-1322.
European Search Report dated Jun. 24, 2010 corresponding to European Patent Appln. No. 09004732.5.
Chinese Office Action issued Aug. 8, 2011, for corresponding Chinese Appln. No. 200910134452.8.
Zheng et al., "Adaptive Selection of Motion Models for Panoramic Video Coding", IEEE International Conference on Multimedia and Expo, 2007, pp. 1319-1322.

* cited by examiner

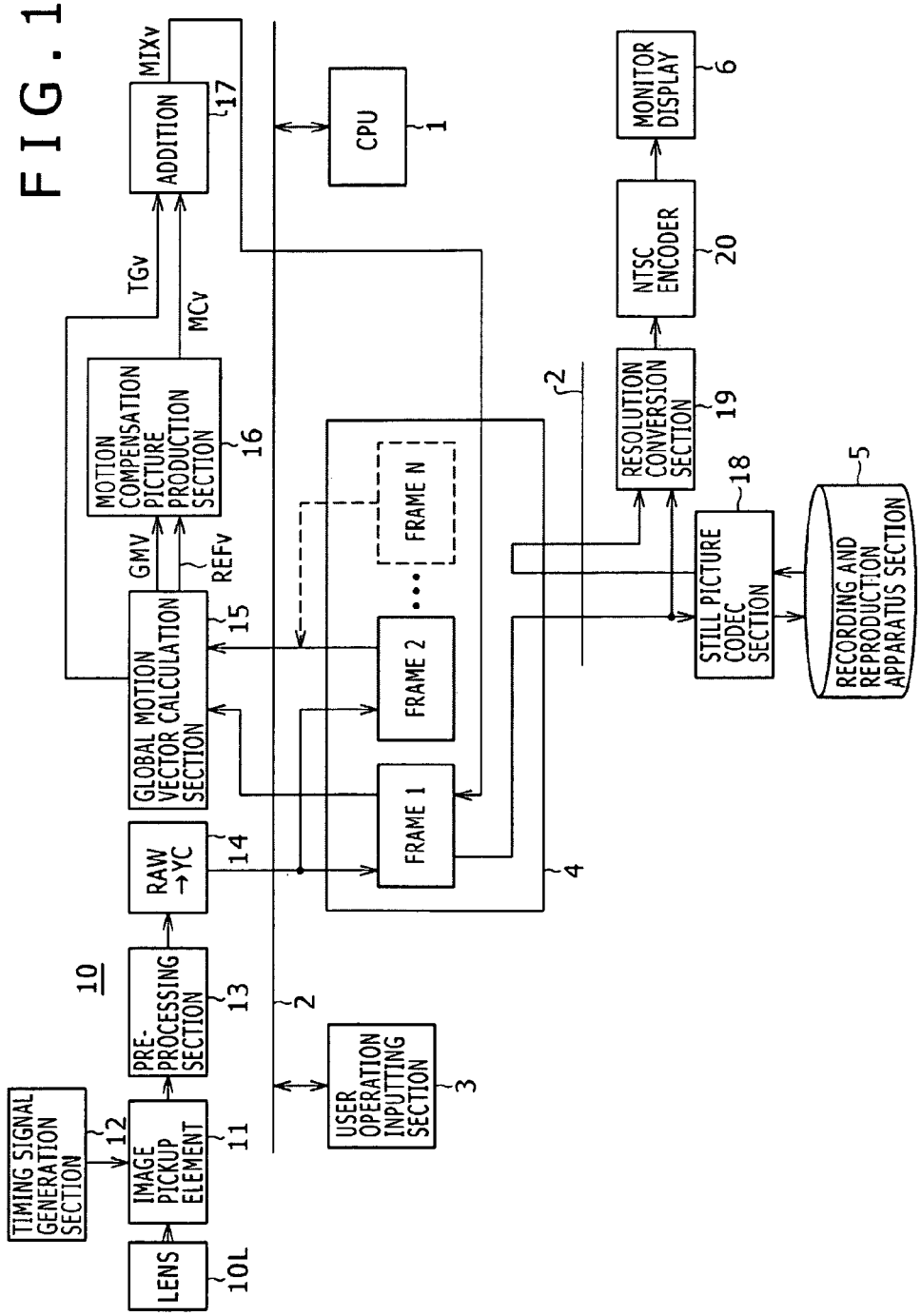

FIG.2A    FIG.2B
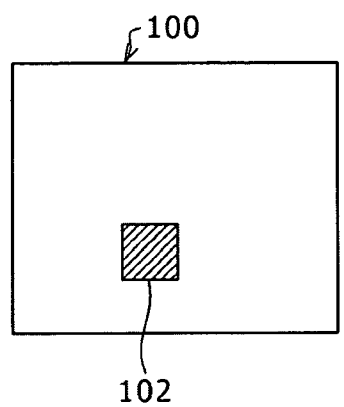
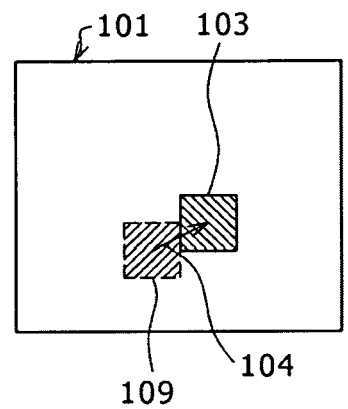
FIG.3
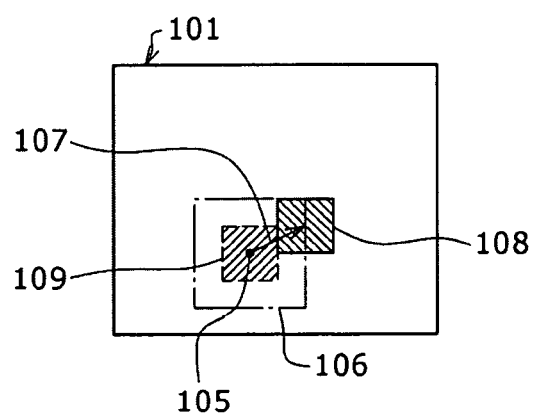

FIG.21

(EXPRESSION 7) EXTENSION EXPRESSION OF AFFINE TRANSFORMATION $$\begin{pmatrix} v \\ w \end{pmatrix} = \begin{pmatrix} p_0 \cdot x + q_0 \cdot y + r_0 & p_1 \cdot x + q_1 \cdot y + r_1 & c \\ p_2 \cdot x + q_2 \cdot y + r_2 & p_3 \cdot x + q_3 \cdot y + r_3 & f \end{pmatrix} \begin{pmatrix} x \\ y \\ 1 \end{pmatrix}$$

FIG.22

(EXPRESSION 8) EXTENDED AFFINE TRANSFORMATION $$\begin{pmatrix} v \\ w \end{pmatrix} = \begin{pmatrix} a & b & c & d & e & f \\ g & h & i & j & k & l \end{pmatrix} \begin{pmatrix} x^2 \\ xy \\ y^2 \\ x \\ y \\ 1 \end{pmatrix}$$

$$= \begin{pmatrix} a \cdot x^2 + b \cdot xy + c \cdot y^2 + d \cdot x + e \cdot y + f \\ g \cdot x^2 + h \cdot xy + i \cdot y^2 + j \cdot x + k \cdot y + l \end{pmatrix}$$

FIG.23

(EXPRESSION 9) SOLUTION 1 TO EXTENDED AFFINE TRANSFORMATION BY LEAST SQUARES METHOD $$a = \frac{V_0 \cdot C_1 - V_1 \cdot C_0}{A_0 \cdot C_1 - A_1 \cdot C_0}$$

$$b = \frac{W_0 \cdot D_1 - W_1 \cdot D_0}{B_0 \cdot D_1 - B_1 \cdot D_0}$$

$$c = \frac{V_0 \cdot A_1 - V_1 \cdot A_0}{A_1 \cdot C_0 - A_0 \cdot C_1}$$

$$d = \frac{W_0 \cdot B_1 - W_1 \cdot B_0}{B_1 \cdot D_0 - B_0 \cdot D_1}$$

FIG. 24

(EXPRESSION 10) SOLUTION 2 TO EXTENDED AFFINE TRANSFORMATION BY LEAST SQUARES METHOD $$e = \frac{1}{xy \cdot y - x \cdot y2} \{(x2y \cdot x - x3 \cdot y)a + (xy2 \cdot x - x2y \cdot y)b + (x \cdot y3 - xy2 \cdot y)c + (xy \cdot x - x2 \cdot y) d + vx \cdot y - vy \cdot x\}$$

$$f = \frac{1}{x \cdot y2 - xy \cdot y} \{(x2y \cdot xy - x3 \cdot y2)a + (xy2 \cdot xy - x2y \cdot y2)b + (xy \cdot y3 - xy2 \cdot y2)c + ((xy)^2 - x2 \cdot y2)d + vx \cdot y2 - vy \cdot x\}$$

[FOR g, h, i, j, k AND l, v IN EXPRESSIONS OF a, b, c, d, e AND f IS REPLACED WITH w]

FIG. 25

(EXPRESSION 11) SOLUTION 3 TO EXTENDED AFFINE
TRANSFORMATION BY LEAST SQUARES METHOD

WHERE

| | |
|---|---|
| t0  | R2·S3 - R3·S2 |
| t1  | P2·S3 - P3·S3 |
| t2  | Q2·S3 - Q3·S3 |
| t3  | T2·S3 - T3·S3 |
| t4  | R0·S3 - R3·S0 |
| t5  | R1·S3 - R3·S1 |
| t6  | Q2·P3 - Q3·P2 |
| t7  | R2·P3 - R3·P2 |
| t8  | S2·P3 - S3·P2 |
| t9  | T2·P3 - T3·P2 |
| t10 | Q0·P3 - Q3·P0 |
| t11 | Q1·P3 - Q3·P1 |

| | | |
|---|---|---|
| A0 | t0·(P0·S3 - P3·S0) | - t4·t1 |
| C0 | t0·(Q0·S3 - Q3·S0) | - t4·t2 |
| V0 | t0·(T0·S3 - T3·S0) | - t4·t3 |

| | | |
|---|---|---|
| A1 | t0·(P1·S3 - P3·S1) | - t5·t1 |
| C1 | t0·(Q1·S3 - Q3·S1) | - t5·t2 |
| V1 | t0·(T1·S3 - T3·S1) | - t5·t3 |

| | | |
|---|---|---|
| B0 | t6·(R0·P3 - R3·S0) | - t10·t7 |
| D0 | t6·(S0·P3 - S3·S0) | - t10·t8 |
| W0 | t6·(T0·P3 - T3·S0) | - t10·t9 |

| | | |
|---|---|---|
| B1 | t6·(R1·P3 - R3·P1) | - t11·t7 |
| D1 | t6·(S1·P3 - S3·P1) | - t11·t8 |
| W1 | t6·(T1·P3 - T3·P1) | - t11·t9 |

FIG. 26

(EXPRESSION 12) SOLUTION 4 TO EXTENDED AFFINE
TRANSFORMATION BY LEAST SQUARES METHOD t12 = n·y2 − y·y
t13 = n·x2y − x2·y
t14 = n·y3 − y2·y
t15 = n·xy2 − xy·y
t16 = n·xy − x·y
t17 = n·y·y − v·y
t18 = n·wy − w·y

P0 = t12·Σx4 − Σx2·Σx2 · t13·t13
Q0 = t12·Σx2y2 − Σx2·Σy2 · t13·t14
R0 = t12·Σx3y − Σx2·Σxy · t13·t15
S0 = t12·Σx3 − Σx2·Σx · t13·t16
T0 = t12·Σvx2 − Σx2·Σv · t13·t17

P1 = t12·Σx2y2 − Σy2·Σx2 · t14·t13
Q1 = t12·Σy4 − Σy2·Σy2 · t14·t14
R1 = t12·Σxy3 − Σy2·Σxy · t14·t15
S1 = t12·Σxy2 − Σy2·Σx · t14·t16
T1 = t12·Σvy2 − Σy2·Σv · t14·t17

P2 = t12·Σx3y − Σxy·Σx2 · t15·t13
Q2 = t12·Σxy3 − Σxy·Σy2 · t15·t14
R2 = t12·Σx2y2 − Σxy·Σxy · t15·t15
S2 = t12·Σx2y − Σxy·Σx · t15·t16
T2 = t12·Σvxy − Σxy·Σv · t15·t17

(EXPRESSION 13) SOLUTION 5 TO EXTENDED AFFINE TRANSFORMATION BY LEAST SQUARES METHOD

WHERE n = TOTAL NUMBER OF BLOCKS $x4 = \Sigma x^4$
$x3y = \Sigma x^3 y$
$x2y2 = \Sigma x^2 y^2$
$xy3 = \Sigma xy^3$
$y4 = \Sigma y^4$ $x3 = \Sigma x^3$
$x2y = \Sigma x^2 y$
$xy2 = \Sigma xy^2$
$y3 = \Sigma y^3$ $x2 = \Sigma x^2$
$xy = \Sigma xy$
$y2 = \Sigma y^2$ $x = \Sigma x$
$y = \Sigma y$ $vx2 = \Sigma vx^2$
$vxy = \Sigma vxy$
$vy2 = \Sigma vy^2$
$vx = \Sigma vx$
$vy = \Sigma vy$
$v = \Sigma v$

FIG.34 (PRIOR ART)

(EXPRESSION 1) AFFINE TRANSFORMATION $$\begin{pmatrix} v \\ w \end{pmatrix} = \begin{pmatrix} a & b & c \\ d & e & f \end{pmatrix} \begin{pmatrix} x \\ y \\ 1 \end{pmatrix} = \begin{pmatrix} a \cdot x + b \cdot y + c \\ d \cdot x + e \cdot y + f \end{pmatrix}$$

FIG.35 (PRIOR ART)

(EXPRESSION 2) APPLICATION 1 OF LEAST SQUARES METHOD TO AFFINE TRANSFORMATION $$Vn = \begin{pmatrix} a & b & c \\ d & e & f \end{pmatrix} \begin{pmatrix} xn \\ yn \\ 1 \end{pmatrix}$$

$$\varepsilon n^2 = \left| Vn - \begin{pmatrix} vn \\ wn \end{pmatrix} \right|^2$$

$$\varepsilon^2 = \sum \varepsilon n^2$$
$$= \sum \{ (a \cdot xn + b \cdot yn + c - vn)^2 + (d \cdot xn + e \cdot yn + f - wn)^2 \}$$

WHERE xn = HORIZONTAL COMPONENT OF CENTER COORDINATE OF EACH BLOCK n
yn = VERTICAL COMPONENT OF CENTER COORDINATE OF EACH BLOCK n
vn = HORIZONTAL COMPONENT OF MOTION VECTOR OF EACH BLOCK n
wn = VERTICAL COMPONENT OF MOTION VECTOR OF EACH BLOCK n
Vn = THEORETICAL VECTOR OF EACH BLOCK n DETERMINED FROM AFFINE TRANSFORMATION
εn = ERROR (DISTANCE) OF MOTION VECTOR OF EACH BLOCK n FROM THEORETICAL VECTOR
ε = SUM TOTAL OF εn

FIG.36
(PRIOR ART)

(EXPRESSION 3) APPLICATION 2 OF LEAST SQUARES METHOD TO AFFINE TRANSFORMATION

FROM $$\frac{\partial \varepsilon^2}{\partial a}=0, \quad \frac{\partial \varepsilon^2}{\partial b}=0, \quad \frac{\partial \varepsilon^2}{\partial c}=0$$

a·x2+b·xy+c·x=vx  ···① a·xy+b·y2+c·y=vy  ···② a·x+b·y+c·n=v  ···③

WHERE
n  =SUM TOTAL OF BLOCKS
x2 =$\Sigma x^2$
xy =$\Sigma xy$
y2 =$\Sigma y^2$
x  =$\Sigma x$
y  =$\Sigma y$
yx =$\Sigma vx$
vy =$\Sigma xy$
v  =$\Sigma v$

FIG. 37 (PRIOR ART)

(EXPRESSION 4) APPLICATION 3 OF LEAST SQUARES METHOD TO AFFINE TRANSFORMATION

FROM ①, ②, ③ OF (EXPRESSION 3)

$$a = \frac{(\Sigma y^2 - y^2)(\Sigma vx - v \cdot x) - (\Sigma xy - x \cdot y)(\Sigma vy - v \cdot y)}{(\Sigma x^2 - x^2)(\Sigma y^2 - y^2) - (\Sigma xy - x \cdot y)^2}$$

$$b = \frac{(\Sigma xy - x \cdot y)(\Sigma vx - v \cdot x) - (\Sigma x^2 - x^2)(\Sigma vy - v \cdot y)}{(\Sigma xy - x \cdot y)^2 - (\Sigma x^2 - x^2)(\Sigma y^2 - y^2)}$$

$$c = \frac{(\Sigma y^2 - xy \cdot y)(\Sigma vx - v \cdot x^2) - (\Sigma xy \cdot x - x^2 \cdot y)(\Sigma vy \cdot x - v \cdot xy)}{(\Sigma y^2 - xy \cdot y)(\Sigma x^2 - n \cdot x^2) - (\Sigma xy \cdot x - x^2 \cdot y)(\Sigma x \cdot y - n \cdot xy)}$$

FIG. 38 (PRIOR ART)

(EXPRESSION 5) APPLICATION 4 OF LEAST SQUARES METHOD TO AFFINE TRANSFORMATION $$d = \frac{(\Sigma y^2 - y^2)(\Sigma wx - w \cdot x) - (\Sigma xy - x \cdot y)(\Sigma wy - w \cdot y)}{(\Sigma x^2 - x^2)(\Sigma y^2 - y^2) - (\Sigma xy - x \cdot y)^2}$$

$$e = \frac{(\Sigma xy - x \cdot y)(\Sigma wx - w \cdot x) - (\Sigma x^2 - x^2)(\Sigma wy - w \cdot y)}{(\Sigma xy - x \cdot y)^2 - (\Sigma x^2 - x^2)(\Sigma y^2 - y^2)}$$

$$f = \frac{(\Sigma y^2 - xy \cdot y)(\Sigma wx - w \cdot x^2) - (\Sigma xy \cdot x - x^2 \cdot y)(\Sigma wy \cdot x - w \cdot xy)}{(\Sigma y^2 - xy \cdot y)(\Sigma x^2 - n \cdot x^2) - (\Sigma xy \cdot x - x^2 \cdot y)(\Sigma x \cdot y - n \cdot xy)}$$

WHERE wx = Σwx
wy = Σwy
w  = Σw

FIG.39A
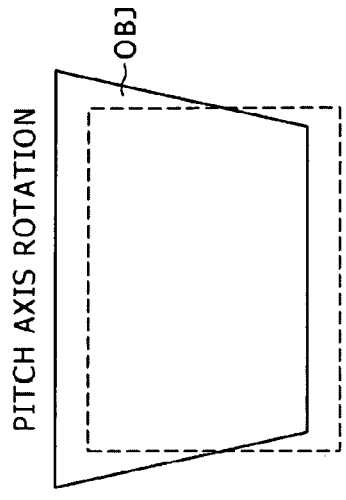
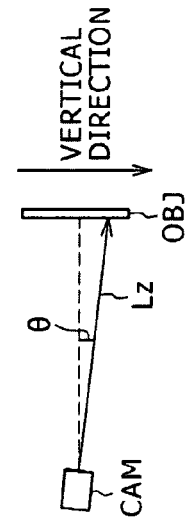
FIG.39B
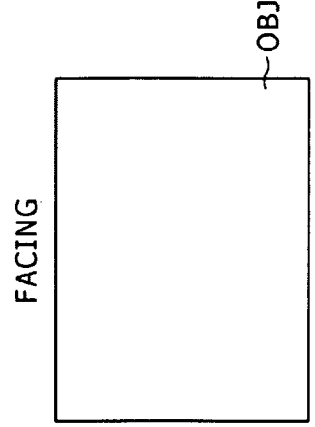
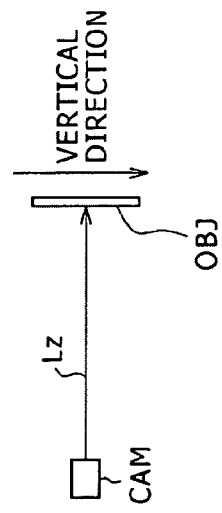

FIG.40

(EXPRESSION 6) ORTHOGONAL PROJECTION TRANSFORMATION $$a = \frac{a \cdot x + b \cdot y + c}{g \cdot x + h \cdot y + i}$$

$$b = \frac{d \cdot x + e \cdot y + f}{j \cdot x + k \cdot y + l}$$

IMAGE PROCESSING APPARATUS AND METHOD USING EXTENDED AFFINE TRANSFORMATIONS FOR MOTION ESTIMATION

CROSS REFERENCES TO RELATED APPLICATIONS

The present application claims priority to Japanese Patent Application JP 2008-105248 filed in the Japan Patent Office on Apr. 15, 2008, the entire contents of which are incorporated herein by reference.

BACKGROUND

The present application relates to an image processing apparatus and method by which a global motion representative of deformation of an entire image between two screen images is calculated.

A block matching technique which determines a motion vector between two screen images from image information itself is a technique of an old history.

The block matching technique is a method of calculating a motion vector between two screen images including a reference screen image which is a noticed screen image and an original screen image (hereinafter referred to as target screen image) from which a motion of the reference screen image originates. According to the block matching technique, the motion vector is calculated by calculating a correlation between the reference screen image and the target screen image with regard to blocks of a rectangular region of a predetermined size (a target block and a reference block).

The block matching technique includes two cases including a case wherein the target screen image precedes in time to the reference screen image and another case wherein the reference screen image precedes in time to the target screen image. An example of the former case is motion detection by the MPEG (Moving Picture Experts Group) system, and an example of the latter case is noise reduction by superposition of image frames hereinafter described.

It is to be noted that, in the present specification, the term screen image signifies an image formed from image data of one frame or one field. However, for the convenience of description, in the following description of the present specification, it is assumed that one screen image is formed from one frame. Therefore, one screen image is hereinafter referred to as frame. Accordingly, a reference screen image is hereinafter referred to as reference frame and a target screen image is hereinafter referred to as target frame.

A motion vector detection method by the block matching has been developed particularly in regard to pan-tilt detection and image pickup object tracking of a television camera, moving picture coding of the MPEG system and so forth. In the nineties, application over a wide range including sensorless camera shake correction by superposition of images, noise reduction upon image pickup in low illuminance and so forth has been promoted.

Further, the motion vector detection method by the block matching is applied not only for the image recognition applications and the camera shake correction applications but also for new applications like automatic adjustment of the shutter speed of an image pickup apparatus and double-speed frame rate conversion of a liquid crystal television set.

Incidentally, a motion vector, that is, a local motion vector, of each of a large number of target blocks set in a screen image is detected, and a global motion representative of deformation applied to the entire image between the two screen images is calculated using a large number of local motion vectors detected in this manner. The global motion normally indicates a motion and an amount of the motion of the background of the image.

As a related art, a distortion correction method is disclosed in Japanese Patent Laid-Open No. 2007-221631 (hereinafter referred to as Patent Document 1) wherein one screen image is divided into a large number of blocks and a vector is determined for each of the blocks. Then, the motion vectors determined in this manner are directly used to calculate a global motion. The technique of Patent Document 1 had been used as a camera shake correction technique principally for moving pictures till several years ago within which the number of pixels was small.

With the technique disclosed in Patent Document 1, it is possible to detect a global motion with a hardware scale of a low cost and implement good sensorless or gyroless camera shake correction and noise reduction for moving pictures and still pictures of high picture quality.

However, where one screen image is divided into comparatively large blocks like, for example, approximately 16 blocks, there is a problem that, when a moving image pickup object is included in the image, it is difficult to follow up the moving image pickup object.

Thus, if the number of blocks is increased, for example, to approximately 64, then a large number of local motion vectors regarding a comparatively small image region can be used, and therefore, it becomes possible to follow up the movement of a moving image pickup object to some degree. However, where such a configuration as just described is adopted, a problem occurs with the technique of Patent Document 1 that the hardware scale increases and the cost merit which is an advantage of the technique of Patent Document 1 cannot be made the most of.

Meanwhile, as a method of determining a global motion, a method of applying affine transformation to a plurality of detected local motion vectors has been proposed.

FIG. 34 illustrates a general formula of the affine transformation as (expression 1). Referring to FIG. 34, in the (expression 1), v represents a horizontal component of a motion vector of a target block, w represents a vertical component of the motion vector of the target block, and a, b, c, d, e and f represent affine parameters. In ordinary affine transformation, the affine parameters a, b, c, d, e and f are fixed values, Further, x and y represent a horizontal component and a vertical component of the coordinate of the center of the target block, respectively.

From the affine parameters determined by a convergence mathematical operation process of a global motion and the coordinate of the center of each target block, a motion vector corresponding to the global motion is obtained. Such a motion vector as just mentioned is hereinafter referred to as ideal motion vector. The sum total $\epsilon$ of errors between the ideal vectors and observed motion vectors detected by block matching is represented like an (expression 2) of FIG. 35.

The proposition that a global motion is derived is estimation of the affine parameters a to f which minimize the sum total $\epsilon$ of the errors described above and can be solved, for example, by the least squares method. An (expression 3), another (expression 4) and a further (expression 5) of FIGS. 36, 37 and 38, respectively, illustrate a deriving process of the affine parameters a to f and results of the deriving process.

While the parameters of the affine transformation are calculated comparatively easily in this manner, the effect of this is high. Since the affine transformation is ready not only for parallel movement, rotation and expansion or contraction of an image but also for some degree of deformation, most camera shake, that is, fine correction of the camera work, is covered.

Such affine transformation as described above is disclosed, for example, in Japanese Patent Laid-Open No. 2005-321902 (hereinafter referred to as Patent Document 2).

SUMMARY

However, the affine transformation has a drawback in that it is not ready for "oblique distortion." The "oblique distortion" is a phenomenon brought about by a component of rotation of a pitch axis, that is, an axis in the vertical direction or a yaw axis, that is, an axis in the horizontal direction perpendicular to the vertical direction, of camera shake. By the "oblique distortion," a rectangular plane which is in an exactly facing state is deformed into a trapezoidal shape as seen in FIG. 39B, and therefore, is also called trapezoidal distortion or keystone.

In particular, when a camera CAM exactly faces an image pickup object OBJ such that an optical axis Lz of the camera CAM extends perpendicularly to a rectangular plane of the image pickup object OBJ as seen on the lower side in FIG. 39A, a picked up image of the rectangular plane of the image pickup object OBJ directly assumes a rectangular shape as seen on the upper side in FIG. 39A.

On the other hand, for example, if the optical axis Lz of the camera CAM undergoes pitch axis rotation, that is, rotation in a vertical plane, by an angle θ without exactly facing the image pickup object OBJ as seen on the lower side in FIG. 39B, then the picked up image of the rectangular plane of the image pickup object OBJ exhibits a trapezoidal shape wherein the length in the leftward and rightward direction, that is, in the horizontal direction, of the image varies linearly in response to the angle θ as seen on the upper side in FIG. 39B.

It is to be noted that, though not shown, if the optical axis Lz of the camera CAM does not exactly face the image pickup object OBJ but is subject to yaw axis rotation, that is, rotation within a horizontal plane, by an angle θ, then the picked up image of the rectangular plane of the image pickup object OBJ exhibits a trapezoidal shape wherein the length in the upward and downward direction, that is, in the vertical direction of the image, varies linearly in response to the angle θ.

A process for returning an image picked up in such a deformed form as described above by camera shake to an image of an original shape in an exactly facing state is "oblique distortion" correction or trapezoidal correction. However, such correction cannot be represented with the parameters of the affine transformation described above. In particular, if it is intended to carry out such "oblique distortion" correction of returning such an "obliquely distorted" trapezoidal image as shown in FIG. 39B to an image of a rectangular shape, an upper portion of the image along the vertical axis or y axis should be contracted horizontally while a lower portion of the image should be expanded horizontally. However, of the parameters of the affine transformation, the parameter which participates in horizontal expansion or contraction is a, and since the parameter a is a fixed value, the affine transformation cannot be ready for the correction described above.

In order to avoid such a problem as just described, it has been proposed to use orthogonal projection transformation in place of the affine transformation. The orthogonal projection transformation is represented by an (expression 6) illustrated in FIG. 40 and can represent projection transformation from an arbitrary plane to another plane in a three-dimensional space.

However, it is very difficult to apply the orthogonal projection transformation to such a case wherein one global motion is specified from a large number of vectors as is assumed here. This is because it is difficult to use the least squares method from the shape of the (expression 6) of FIG. 40 and, also where some other technique is used, a large amount of mathematical operation is required.

As a realistic problem, since an actual image pickup object is a three-dimensional object, observed local motion vectors include a large number of image pickup portions to which the distance is different from each other. In this instance, application of the orthogonal projection transformation is nothing but mere application. Accordingly, it seems a reasonable decision that, if a very high cost required to obtain a general solution to the orthogonal projection transformation is considered, then the orthogonal projection transformation does not match as a countermeasure for cost reduction.

In order to apply the orthogonal projection transformation more simply, it is possible to adopt a method of determining a solution with regard to six vectors. This is because, since 12 parameters must be determined, if coordinates of the six vectors are substituted, then 6×2 first-degree equations with six unknowns are produced and the solutions can be derived comparatively easily by inverse matrix calculation of a 6×6 matrix. Accordingly, only it is necessary that six vectors can be selected appropriately from among a large number of local vectors.

However, if a case is considered wherein a moving image pickup object is included in a picked up image, then since it cannot be expected that each of the local vectors has considerable accuracy, it is difficult to extract only those vectors having high accuracy from among a large number of local motion vectors. Therefore, it is very difficult to appropriately select six vectors from among a large number of local motion vectors.

Therefore, it is desirable to provide a technique which makes it possible to detect a global motion favorably even if an image has "obliquely distorted" deformation.

According to an embodiment, there is provided an image processing apparatus including motion vector detection section configured to detect a motion vector of each of a plurality of blocks of a predetermined size set in an image and formed from a plurality of pixels, and global motion calculation section configured to carry out convergence mathematical operation, from the motion vectors of the blocks detected by the motion vector detection section, using extended affine transformation in which at least one of affine parameters is represented by a function of a variable regarding a displacement axis of the image to calculate a global motion representative of deformation applied to the entire image.

In the image processing apparatus, in place of the affine transformation in which all of affine parameters are fixed values, the extended affine transformation in which at least one of the affine transformation parameters is a function of a variable regarding a displacement axis of the image.

For example, if it is tried to carry out "oblique distortion" correction of returning, for example, such an "obliquely distorted" trapezoidal image as shown in FIG. 39B to an image of a rectangular shape, then upper portion of the image should be contracted horizontally along the vertical axis or y axis while a lower portion of the image should be expanded horizontally. From among the affine parameters in the (expression 1) of the affine transformation illustrated in FIG. 34, the parameter which participates in horizontal expansion or contraction is a. Therefore, if the extended affine transformation in which, for example, a function of the variable y with respect to the vertical axis or y axis is used as the affine parameter a is used, then such a global motion which takes also "obliquely distorted" deformation of an image as shown in FIG. 39B can be calculated.

Since the extended affine transformation includes an increased number of transformation parameters and is flexible, there is the possibility that it may be ready also for an erroneous motion vector component such as a moving image pickup object or noise and consequently error vectors may not be excluded by the convergence mathematical operation.

Therefore, preferably the image processing apparatus is configured such that, in initial convergence mathematical operation by the global motion calculation section, ordinary affine transformation in which the affine parameters of fixed coefficients are used is carried out from the motion vectors of the blocks detected by the motion vector detection section, and the convergence mathematical operation in which the extended affine transformation is used is started after the initial convergence mathematical operation.

In the image processing apparatus, the ordinary affine transformation in which the affine parameters of fixed coefficients are used is carried out in the initial convergence mathematical operation by the global motion calculation section. Then, after the erroneous motion vector components such as a moving image pickup object or noise are excluded from the motion vector components by the motion vector detection section, the convergence mathematical operation in which the extended affine transformation is used is carried out.

According to another embodiment, there is provided an image processing method including: a motion vector detection step of detecting a motion vector of each of a plurality of blocks of a predetermined size set in an image and formed from a plurality of pixels; and a global motion calculation step of carrying out convergence mathematical operation, from the motion vectors of the blocks detected at the motion vector detection step, using extended affine transformation in which at least one of affine parameters is represented by a function of a variable regarding a displacement axis of the image to calculate a global motion representative of deformation applied to the entire image.

In summary, with the image processing apparatus, since the extended affine transformation in which at least one of the affine parameters is represented by a function of a variable regarding a displacement axis of the image is used, a global motion which takes also "obliquely distorted" deformation of an image into consideration can be calculated.

Additional features and advantages are described herein, and will be apparent from the following Detailed Description and the figures.

BRIEF DESCRIPTION OF THE FIGURES

FIG. 1 is a block diagram showing an example of a configuration of an image pickup apparatus to which an image processing apparatus according to a preferred embodiment;

FIGS. 2A, 2B and 3 to 10 are schematic diagrammatic views illustrating a block matching process by the image processing apparatus;

FIGS. 21 to 27 are views illustrating examples of a process for calculation of a global motion from local motion vectors carried out by the image processing apparatus;

FIGS. 34 to 38 are views illustrating expressions used in an example of a process for determining a global motion from local motion vectors;

FIGS. 39A and 39B are schematic views illustrating a problem where a global motion is determined from local motion vectors using ordinary affine transformation in related art; and FIG. 40 is a view illustrating an expression used for a process of determining a global motion from local motion vectors using orthogonal projection transformation.

DETAILED DESCRIPTION

Figure 4:
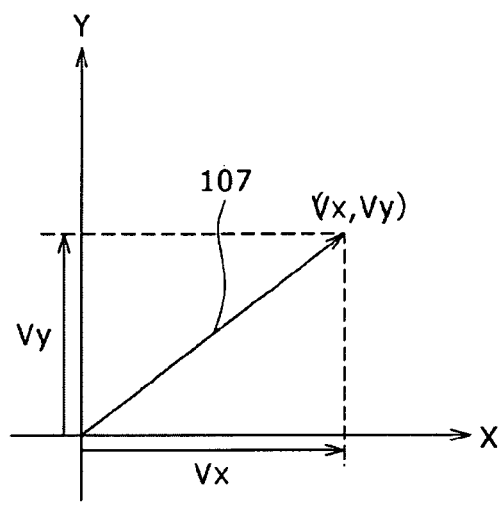

The present application is described below in greater detail with reference to the figures according to an embodiment.

[First Embodiment]

The image pickup apparatus according to the first embodiment is generally configured such that a plurality of still images picked up by an image pickup device or imager are positioned and superposed with each other to reduce noise of the images.

In an environment in which a user holds an image pickup apparatus by hand to pick up an image, camera shake is likely to occur. Where still pictures are picked up by consecutive shooting with an image pickup apparatus held by a hand of a user in this manner, for example, the first still picture is used as a target frame and the second and succeeding still pictures are used as reference frames.

Where a reference frame can be positioned at the position of the target frame by applying a transformation process including parallel translation, rotation and expansion or contraction to the entire reference frame, the transformation process applied to the entire reference frame is a global motion. The global motion normally indicates a movement and an amount of movement of the background of the image.

Camera shake signifies that a global motion occurs with respect to the target frame by an amount by which image transformation including parallel translation, rotation and expansion or contraction is carried out by the reference frame with respect to the target frame.

In the description of the present embodiment, the first one of picked up still pictures is used as a reference, that is, as a target frame for the simplified description. However, this is not essential. A global motion may be re-defined using an arbitrary nth still picture as a target frame and using an arbitrary mth (n≠m) still picture as a reference frame. Or, a global motion may be defined for two frame images which are different in time in moving pictures. Or else, a global motion process may be applied not for the entire effective picture frame from within one frame of a picked up image but only for part of an image of one frame.

If a global motion is determined, then it is possible to calculate a motion vector representing a motion applied to the entire screen image between the target frame and the reference frame from the determined global motion. Such a motion vector as just mentioned is hereinafter referred to as global motion vector. The global motion vector can be determined with regard to each of a large number of target blocks set on the screen image.

Then, if the global motion vector can be determined accurately based on the global motion, then camera shake can be corrected favorably. Or, it is possible to superpose the frame images with each other while the global motion vector is corrected against the camera shake.

In the following description, to superpose a plurality of images to reduce noise using motion vector detection and motion compensation, wherein two images of different frames are positioned using a motion vector, is referred to as noise reduction, and an image whose noise is reduced by such noise reduction is referred to as reduced noise image.

In the present embodiment, a motion vector is detected by the block matching method described hereinabove. Further, in the present embodiment, one screen image is divided into a large number of blocks, and a motion vector in a unit of a block (such motion vector is hereinafter referred to as local motion vector) is detected by the block matching method. Further, an index to reliability of the local motion vector is detected in such a manner as hereinafter described using a correlation value in the block matching method. Then, a global motion is calculated only from those of such detected local motion vectors which have high reliability, and a global motion vector of each of the blocks, which is a target block hereinafter described is detected from the calculated global motion.

[Outline of Block Matching]

FIGS. 2A to 7 illustrate an outline of the block matching method. In the block matching method described here, a block, that is, a target block 102, of a rectangular region of a predetermined size including a plurality of pixels in a horizontal direction and a plurality of lines in a vertical direction is assumed in the target frame 100 as seen in FIG. 2A.

In the block matching, a block having a high correlation to the target block 102 is searched out from within a reference frame 101. A reference block 103 shown in FIG. 2B detected as a block having the highest correlation with the target block 102 from within the reference frame 101 is hereinafter referred to as motion compensation block. Further, the positional displacement amount between the target block 102 and the motion compensation block 103 which has the highest correction with the target block 102 is hereinafter referred to as motion vector (refer to reference numeral 104 of FIG. 2B).

The motion vector 104 corresponding to the positional displacement, which includes a positional displacement amount and a positional displacement direction, between the target block 102 and the motion compensation block 103 corresponds, where a projection image block 109 of the target block 102 is assumed at a position of the reference frame 101 same as the position of the target block 102 of the target frame 100, to the positional displacement between the position, for example, the position of the center, of the projection image block 109 of the target block 102 and the position, for example, the position of the center, of the motion compensation block 103. Thus, the motion vector 104 has a positional displacement and a directional component of the positional displacement.

An outline of the block matching process is described. Referring to FIG. 3, the projection image block 109 of the target block 102 of the target frame 100 is assumed at a position of the reference frame 101 which is same as the position of the target block 102 of the target frame 100 as indicated by a broken line in FIG. 3, and the coordinate of the center of the projection image block 109 of the target block 102 is determined as the origin 105 for motion detection. Then, it is assumed that the motion vector 104 exists within a certain range from the origin 105 for motion detection, and a predetermined range centered at the origin 105 for motion detection is set as a search range 106 indicated by an alternate long and short dash line in FIG. 3.

Then, a block, that is, a reference block 108, of the same size as that of the target block 102 is set on the reference screen image. Then, the position of the reference block 108 is moved in a unit of one pixel or a plurality of pixels, for example, in the horizontal direction and the vertical direction within the search range 106. Accordingly, a plurality of reference blocks 108 are set in the search range 106.

Here, the reference block 108 is moved within the search range 106 signifies that, since the origin 105 for motion detection is the position of the center of the target block, the position of the center of the reference block 108 is moved within the search range 106, and pixels which compose the reference block 108 may protrude from the search range 106.

Then, with regard to each reference block 108 set in the search range 106, a vector, that is, a reference vector 107 (refer to FIG. 3), representative of a positional displacement amount and a positional displacement direction of the reference block 108 and the target block 102 is set. Then, a correlation between the image contents of the reference block 108 at the position indicated by each of such reference vectors 107 and the image contents of the target block 102 is evaluated.

Referring to FIG. 4, the reference vector 107 can be represented as vector (Vx, Vy) where Vx is the positional displacement amount of the reference block 108 in the horizontal direction, that is, in the X direction and Vy is the positional displacement amount of the reference block 108 in the vertical direction, that is, in the Y direction. If the coordinate of the position, for example, the coordinate of the position of the center, of the reference block 108 and the coordinate of the position, for example, the coordinate of the position of the center, of the target block 102 are same, then the reference vector 107 is represented as vector (0, 0).

For example, if the reference block 108 is at a position displaced by a one-pixel distance in the X direction from the position of the target block 102, then the reference vector 107 is represented as vector (1, 0). Meanwhile, if the reference block 108 is at a position displaced by a three-pixel distance in the X direction and a two-pixel distance in the Y direction from the position of the target block 102, then the reference vector 107 is vector (3, 2).

Figure 5:
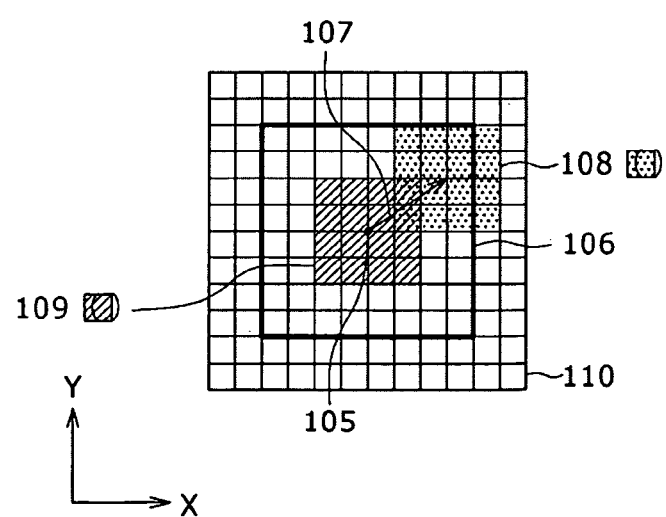

In short, as seen in FIG. 5, the reference vector 107 signifies a positional displacement, which is a vector including a positional displacement amount and a direction of the positional displacement, between each reference block 108 and the target block 102 corresponding to each other. It is to be noted that, in FIG. 5, the positions of the target block 102 and the reference block 108 are individually represented by the positions of the centers of the blocks.

The reference block 108 moves within the search range 106, and in this instance, the position of the center of the reference block 108 moves within the search range 106. Since the reference block 108 includes a plurality of pixels in the horizontal direction and the vertical direction as described hereinabove, the maximum range of the movement of the reference block 108 which is an object of the block matching process with the target block 102 is given as a matching processing range 110 which is wider than the search range 106 as seen in FIG. 5.

Then, the position of the reference block 108 detected as a block having the highest correlation with the image contents of the target block 102 is detected as the position of the target block 102 of the target frame 100 on the reference frame 101, that is, as the position after the movement. Then, the detected reference block is determined as the motion compensation block 103 described hereinabove. Then, the positional displacement amount between the position of the detected motion compensation block 103 and the position of the target block 102 is detected as the motion vector 104 including a directional component as seen in FIG. 2B.

The correlation value representative of the degree of correlation between the target block 102 and the reference block 108 which moves within the search range 106 is calculated basically using corresponding pixel values of the target block 102 and the reference block 108. Various calculation methods including a method which uses the root mean square are available for the calculation of the correlation value.

Figure 6:
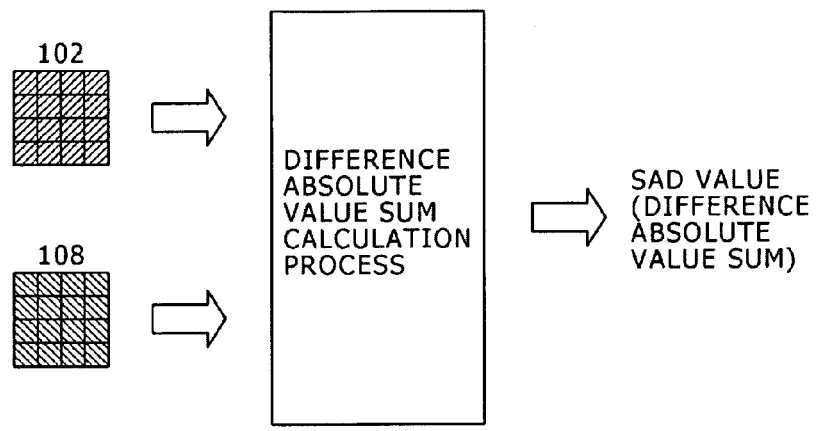

One of correlation values which are used popularly upon calculation of a motion vector is, for example, the sum total of the absolute values of the difference between the luminance value of each pixel in the target block 102 and the luminance value of the corresponding pixel in the search range 106 with regard to all pixels in the blocks as seen in FIG. 6. The sum total of absolute values of the differences is called difference absolute value sum and hereinafter referred to as SAD (Sum of Absolute Difference) value.

Where the SAD value is used as the correlation value, as the SAD value decreases, the correlation increases. Accordingly, from among the reference blocks 108 moving within the search range 106, the reference block 108 at a position at which the SAD value is lowest is the highest correlation reference block which has the highest correlation. This highest correlation reference block is detected as the motion compensation block 103, and the positional displacement amount of the position of the detected motion compensation block 103 from that of the target block 102 is detected as the motion vector.

As described hereinabove, in the block matching, the positional displacement amount of each of a plurality of reference blocks 108 set within the search range 106 from the position of the target block 102 is represented by the reference vector 107 as an amount which includes a directional component.

The reference vector 107 of each reference block 108 has a value corresponding to the position of the reference block 108 on the target block 102. As described hereinabove, in the block matching, the reference vector of the reference block 108 whose SAD value as a correlation value is the lowest is detected as the motion vector 104.

Thus, in the block matching, the SAD value between each of a plurality of reference blocks 108 set within the search range 106 and the target block 102 (such SAD value is hereinafter referred to as SAD value of the reference block 108 for simplified description) is determined first.

Then, the SAD values determined in this manner are stored into a memory in a corresponding relationship to the reference vectors 107 corresponding to the positions of the reference blocks 108. Then, the reference block 108 having the lowest one of the SAD values of all of the reference blocks 108 stored in the memory is detected to detect the motion vector 104. It is to be noted that, in the following description, the reference vector 107 corresponding to the position of the reference block 108 is hereinafter referred to as reference vector 107 of the reference block 108 for simplified description.

The correlation values, in the example described, the SAD values, of a plurality of reference blocks 108, which are set in the search range 106, stored corresponding to the reference vectors 107 corresponding to the positions of the reference blocks 108 are referred to as correlation value table. In the example described, since a SAD value which is a difference absolute value sum is used as a correlation value, the correlation value table is referred to as difference absolute value sum table or SAD table.

Figure 7:
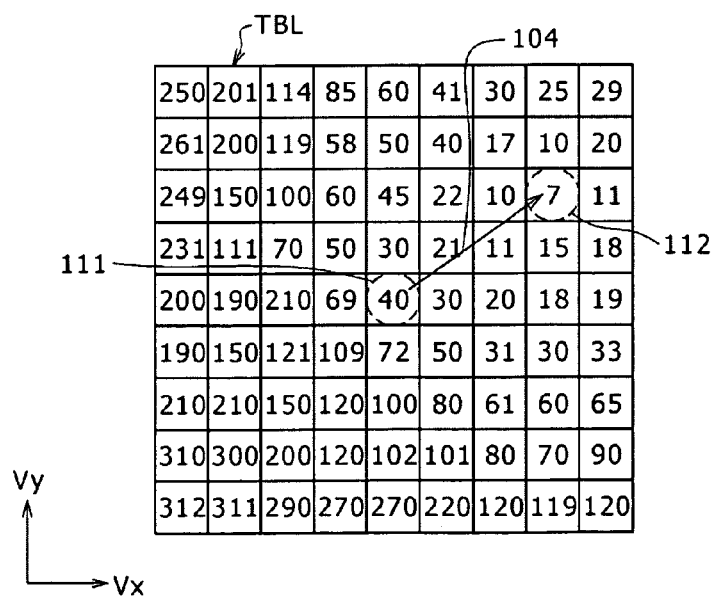

This is indicated as SAD table TBL in FIG. 7. Referring to FIG. 7, in the SAD table TBL shown, a correlation value, in the example illustrated, a SAD value, of each reference block 108 is referred to as correlation value table element. In the example of FIG. 7, the SAD value indicated by reference numeral 111 is a SAD value when the reference vector is the vector (0, 0). Further, in the example of FIG. 7, since the lowest value of the SAD value is "7" when the reference vector is a vector (3, 2), the determined motion vector 104 is the vector (3, 2).

It is to be noted that the positions of the target block 102 and a reference block 108 signify arbitrary particular positions such as, for example, the positions of the centers, of the blocks. Further, a reference vector 107 indicates the displacement amount (including the direction) between the position of the projection image block 109 of the target block 102 of the reference frame 101 and the position of the reference block 108.

The reference vector 107 corresponding to each reference block 108 is a positional displacement of the reference block 108 from the position of the projection image block 109 corresponding to the target block 102 on the reference frame 101. Accordingly, if the position of the reference block 108 is specified, then also the value of the reference vector is specified corresponding to the position. Consequently, the address of a correlation value table element of the reference block in the memory of the SAD table TBL is specified, then a corresponding reference vector is specified.

It is to be noted that such SAD values may be calculated in parallel with regard to two or more target blocks. If the number of target blocks to be processed simultaneously increases, then the processing speed increases. However, since the scale of the hardware for calculating the SAD values increases, the increase of the speed of the processing and the increase of the circuit scale have a trade-off relationship.

[Block Matching of the Embodiment]

The foregoing description of the block matching relates to calculation of a motion vector of one target block. Since the rate at which the target block occupies in the target frame usually is low, it is normally difficult to determine the motion vector as it is as a global motion vector.

Figure 8:
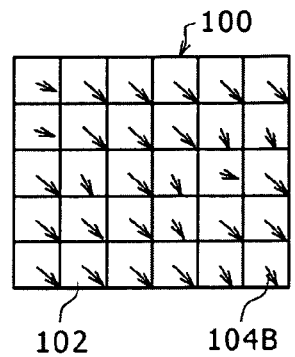

In the present embodiment, as shown in FIG. 8, the target frame 100 is divided into a plurality of target blocks 102 of a size of, for example, 64 pixels×64 lines, and a motion vector or local motion vector 104B of each of the target blocks is determined. At this time, in the present embodiment, an index representative of the reliability of each of the determined local motion vectors is calculated together.

Then, based on the indexes to the reliability of the local motion vectors, only those of the local motion vectors determined with regard to the target frame which have high reliability are extracted. Then, the global motion is calculated and the global motion vector in a unit of a block is calculated only from the extracted local motion vectors having high reliability. Then, the calculated global motion vector in a unit of a block is used to carry out positioning of the reference frame to the target frame in a unit of a block, and then the two frames positioned in this manner are superposed to produce a reduced noise image.

Figure 9:
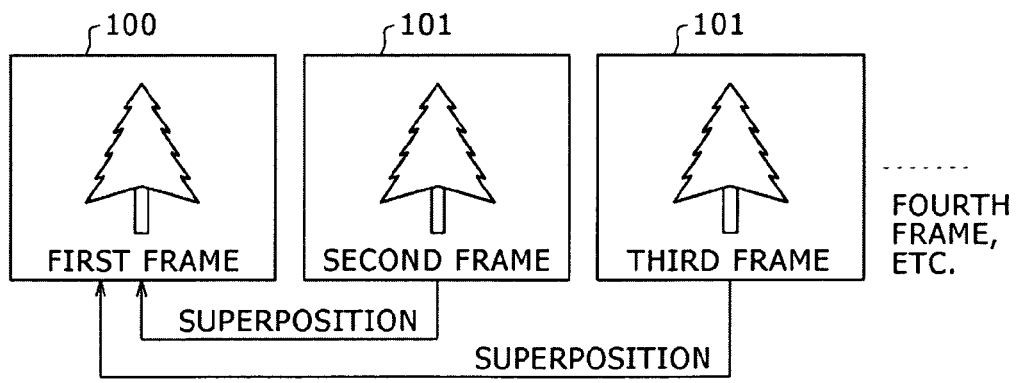
Figure 10:
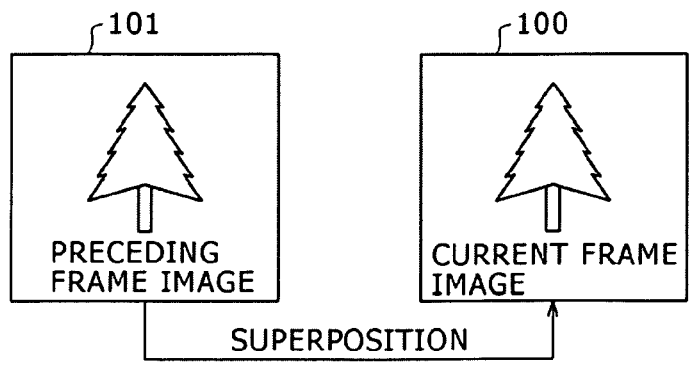

Then, the image pickup apparatus picks up, upon still picture image pickup, a plurality of still images as seen in FIG. 9 at a high speed and determines the first still picture picked up image as a target frame 100. Then, the image pickup apparatus determines a predetermined number of still picture picked up images including the second and succeeding still picture picked up images as reference frames 101 and carries out superposition. Then, the image pickup apparatus records a resulting image of the superposition as a still picture picked up image.

In particular, if the image pickup person depresses the shutter button of the image pickup apparatus, then the predetermined number of still images are picked up at a high speed. Then, on the still image (frame) picked up first, a plurality of still images (frames) picked up later in time are superposed and recorded.

It is to be noted that, though not described in the description of the present embodiment, upon moving picture image pickup, an image of a current frame currently outputted from the image pickup element is determined as an image of the target frame 100, and images in the past of preceding frames are determined as images of the reference frames 101. In other words, upon moving picture image pickup, in order to carry out noise reduction of an image of the current frame, images of preceding frames to the current frame are supposed on the current frame.

[Example of the Hardware Configuration of the Image Pickup Apparatus]

FIG. 1 shows an example of an image pickup apparatus as an image processing apparatus according to an embodiment.

Referring to FIG. 1, the image pickup apparatus shown includes a central processing unit (CPU) 1 connected to a system bus 2, and further includes a pickup image signal processing system 10, a user operation inputting unit 3, an image memory unit 4 and a recording and reproduction apparatus unit 5 connected to the system bus 2. It is to be noted that, though not shown in FIG. 1, the CPU 1 includes a ROM (Read Only Memory) in which a program for carrying out various software processes is stored, a RAM (Random Access Memory) for a working area and so forth.

The image pickup signal processing system 10 of the image pickup apparatus of FIG. 1 carries out such a recording process of picked up image data as hereinafter described in response to an image pickup recording starting operation through the user operation inputting unit 3. Further, the pickup image signal processing system 10 carries out a reproduction process of picked up image data recorded on a recording medium of the recording and reproduction apparatus unit 5 in response to a reproduction starting operation of picked up recorded images through the user operation inputting unit 3.

In the pickup image signal processing system 10, incident light from an image pickup object received through a camera optical system not shown including an image pickup lens 10L is irradiated upon an image pickup element 11 to pick up an image. In the present embodiment, the image pickup element 11 is formed from a CCD (Charge Coupled Device) imager. It is to be noted that the image pickup element 11 may otherwise be formed from a CMOS (Complementary Metal Oxide Semiconductor) imager.

In the image pickup apparatus, if an image pickup recording starting operation is carried out, then an image inputted through the image pickup lens 10L is converted into a pickup image signal by the image pickup element 11. Then, an analog pickup image signal in the form of a raw signal of a bayer array formed from three primary colors of red (R), green (G) and blue (B) is outputted as a signal synchronized with a timing signal from a timing signal generation section 12 from the image pickup element 11. The outputted analog pickup image signal is supplied to a pre-processing section 13, by which pre-processes such as correction of defects and γ correlation are carried out, and a resulting analog image signal is supplied to a data conversion section 14.

The data conversion section 14 converts the analog pickup image signal in the form of a raw signal inputted thereto into a digital pickup image signal or YC data composed of a luminance signal component Y and color difference signal components Cb/Cr. The digital pickup image signal from the data conversion section 14 is written into the image memory unit 4 in accordance with an image pickup instruction received through the user operation inputting unit 3.

In particular, if the image pickup instruction received through the user operation inputting unit 3 is a still picture pickup instruction originating from depression of the shutter button, then the digital pickup image signal from the data conversion section 14 is written into the image memory unit 4. In this instance, a plurality of frames of the digital pickup image signal from the data conversion section 14 to be superposed on each other as described hereinabove are written into first to Nth frame memories 41 to 4N (N is the number of still pictures to be superposed) of the image memory unit 4.

In the present embodiment, image data of the first frame upon depression of the shutter button is written as image data of a target frame into the first frame memory 41. Then, data of the second and succeeding frame images are successively written as image data of reference frames into the second to Nth frame memories 42 to 4N.

After the plural images of different frames are written into the image memory unit 4, the image data of the target frame and the image data of the reference frames are read in by a global motion vector calculation section 15. Then, the global motion vector calculation section 15 carries out such detection of local motion vectors LMV, calculation of the reliability of the local motion vectors LMV, calculation of a global motion and calculation of a global motion vector GMV as hereinafter described. In the present embodiment, the global motion vector calculation section 15 outputs information of the global motion vector GMV, image data TGv of the target frame and image data REFv of the reference frames.

The information of the global motion vector GVM and the image data REFv of the reference frames from the global motion vector calculation section 15 are supplied to a motion compensation picture production section 16. The motion compensation picture production section 16 applies processing corresponding to a global motion, that is, a transformation process including parallel movement, rotation and expansion or contraction, based on the global motion vector GVM to the image data REFv of the reference frames to produce a motion compensation image.

Then, the image data TGv of the target frame from the global motion vector calculation section 15 is supplied to an addition section 17, and image data MCv of the motion compensation image from the motion compensation picture production section 16 is supplied to the addition section 17. The addition section 17 adds the pixels at corresponding positions of the image data TGv and MCv to carry out a superposition process of the images, and outputs image data MIXv of a resulting sum image which is a reduced noise image.

The image data MIXv of the sum image from the addition section 17 is overwritten as image data of the target frame on image data of the preceding target frame into the first frame memory 41 of the image memory unit 4.

In particular, the image data of the target frame of the first frame memory 41 first is the image data of the first frame immediately after the shutter button is depressed. Then, if the image data MCv of the motion compensation image of the second reference frame and the target frame are added, then the image data of the target frame of the first frame memory 41 is re-written into the image data MIXv of the sum image of the result of the addition.

Then, the image data MIXv of the sum image is used as image data of the target frame for the image data of the third reference frame. Then, the global motion vector GVM is calculated similarly as described above by the global motion vector calculation section 15, and an image superposition process is carried out by the addition section 17.

Then, the image data MIXv of the sum image of the result of the addition is overwritten as image data of the target frame on the image data of the preceding target frame into the first frame memory 41 of the image memory unit 4. Thereafter, similar processing operation is carried out also for each of the fourth and succeeding frames as a reference image.

Accordingly, after the superposition process of the images up to the Nth image as a reference image is carried out, a reduced noise image wherein all of the N frames to be superposed are superposed is written in the first frame memory 41 of the image memory unit 4.

Then, the image data MIXv of the sum image as a reduced noise image of the result of the superposition stored in the first frame memory 41 of the image memory unit 4 is supplied to a still picture codec section 18 through the system bus 2 and codec converted by the still picture codec section 18. Output data from the still picture codec section 18 is recorded on the recording medium such as, for example, a DVD (Digital Versatile Disc) or a hard disk of the recording and reproduction apparatus unit 5. In the present embodiment, the still picture codec section 18 carries out an image compression coding process for a still picture in accordance with the JPEG (Joint Photographic Experts Group) system.

Further, in the still picture image pickup mode, before the shutter button is depressed, image data from the data conversion section 14 is supplied to a resolution conversion section 19 through the first frame memory 41 of the image memory unit 4. Then, the image data is converted into data of a predetermined resolution by the resolution conversion section 19 and then supplied to an NTSC (National Television System Committee) encoder 20. The NTSC encoder 20 converts the image data into a standard color image signal of the NTSC system. Then, the resulting standard color image signal is supplied to a monitor display unit 6 which may be formed, for example, from an LCD (Liquid Crystal Display) panel. Then, a monitor image in the still picture image pickup mode is displayed on the display screen of the monitor display unit 6.

The image data of the still pictures recorded on the recording medium of the recording and reproduction apparatus unit 5 are read out in response to a reproduction starting operation through the user operation inputting unit 3 and supplied to the still picture codec section 18, by which they are decoded for reproduction. Then, the image data of a still picture decoded for reproduction is supplied to the NTSC encoder 20 through a buffer memory not shown of the image memory unit 4 and converted into a standard color image signal of the NTSC system by the NTSC encoder 20. Then, the standard color image signal is supplied to the monitor display unit 6, and a reproduction image thereof is displayed on the display screen of the monitor display unit 6.

It is to be noted that, though not shown in FIG. 1, an output image signal from the NTSC encoder 20 can be derived to the outside through an image output terminal.

It is to be noted that, while, in the present embodiment, image data is recorded in a compressed form by the still picture codec section 18, the still picture codec section 18 may be omitted such that the image data is recorded but not in a compressed form.

Further, it is possible to form the global motion vector calculation section 15 and the motion compensation picture production section 16 described above from hardware. Also it is possible to form the global motion vector calculation section 15 and the motion compensation picture production section 16 using a DSP (Digital Signal Processor). Further, the global motion vector calculation section 15 and the motion compensation picture production section 16 may be replaced by software processing by the CPU 1.

Similarly, it is possible to form also the addition section 17 from hardware or using a DSP. Further, also the addition section 17 may be replaced by software processing by the CPU 1. This similarly applied also to the still picture codec section 18.

[Global Motion Vector Calculation Section 15]

In the present embodiment, the global motion vector calculation section 15 carries out a block matching process using SAD values described hereinabove with reference to FIGS. 2A to 7 to carry out local motion vector detection. It is to be noted, however, that, in the present embodiment, the global motion vector calculation section 15 is formed from such hardware as hereinafter described, and a local motion vector is calculated by a layered block matching process and an interpolation process.

Further, as described hereinabove, the global motion vector calculation section 15 calculates also an index to reliability of each of local motion vectors.

Further, the global motion vector calculation section 15 uses only those local motion vectors which have high reliability to calculate a global motion. Then, the global motion vector calculation section 15 calculates a global motion vector in a unit of a block from the calculated global motion.

<Layered Block Matching Process>

In a popular motion vector detection process in popular block matching in related art, a reference block is moved in a unit of a pixel, that is, in a unit of one pixel or in a unit of a plurality of pixels, within a search range, and a SAD value of the reference block at each moved position is calculated. Then, a SAD value which indicates the lowest value from among the SAD values calculated in this manner is detected, and a motion vector is detected based on the reference block position which indicates the lowest SAD value.

Further, in the present embodiment, since one frame is divided into a large number of blocks, the block matching process described above is carried out for the entire screen image by successively changing over the target block and the reference block. Calculation of local motion vectors LMV of all target blocks in the target frame is carried out thereby.

However, such a motion vector detection process in related art as described above has a problem in that, since a reference block is moved in a unit of a pixel within a search range, the number of times of the matching process for calculating the SAD value increases to increase the matching process time in proportion to the search range. Further, the motion vector detection process in related art has another problem that also the capacity of the SAD table increases.

This problem is significant particularly if it is taken into consideration that increase of the number of pixels of a still image and enhancement of the definition (higher definition) of moving pictures advance and the size of one image become very great. The motion vector detection process in related art further has a problem in that the number of times by which the image memory is accessed through the system bus 2 increases and the bus band must be increased.

Taking the foregoing into consideration, in the present embodiment, the layered block matching is carried out wherein a target image or target frame and a reference image or reference frame are reduced in size first to prepare reduced images and intermediate images and then a motion vector search by block matching is carried out in order of the reduced images, intermediate images and original images while reflecting a result of the block matching at the preceding stage on the search at the next stage.

By carrying out the layered block matching, calculation of local motion vectors is carried out efficiently with a comparatively small amount of calculation and comparatively short processing time. It is to be noted that a reduced image is hereinafter referred to as reduction plane, an intermediate image is hereinafter referred to as intermediate plane, and an original image which is not in a reduced form is hereinafter referred to as base plane.

Figure 11:
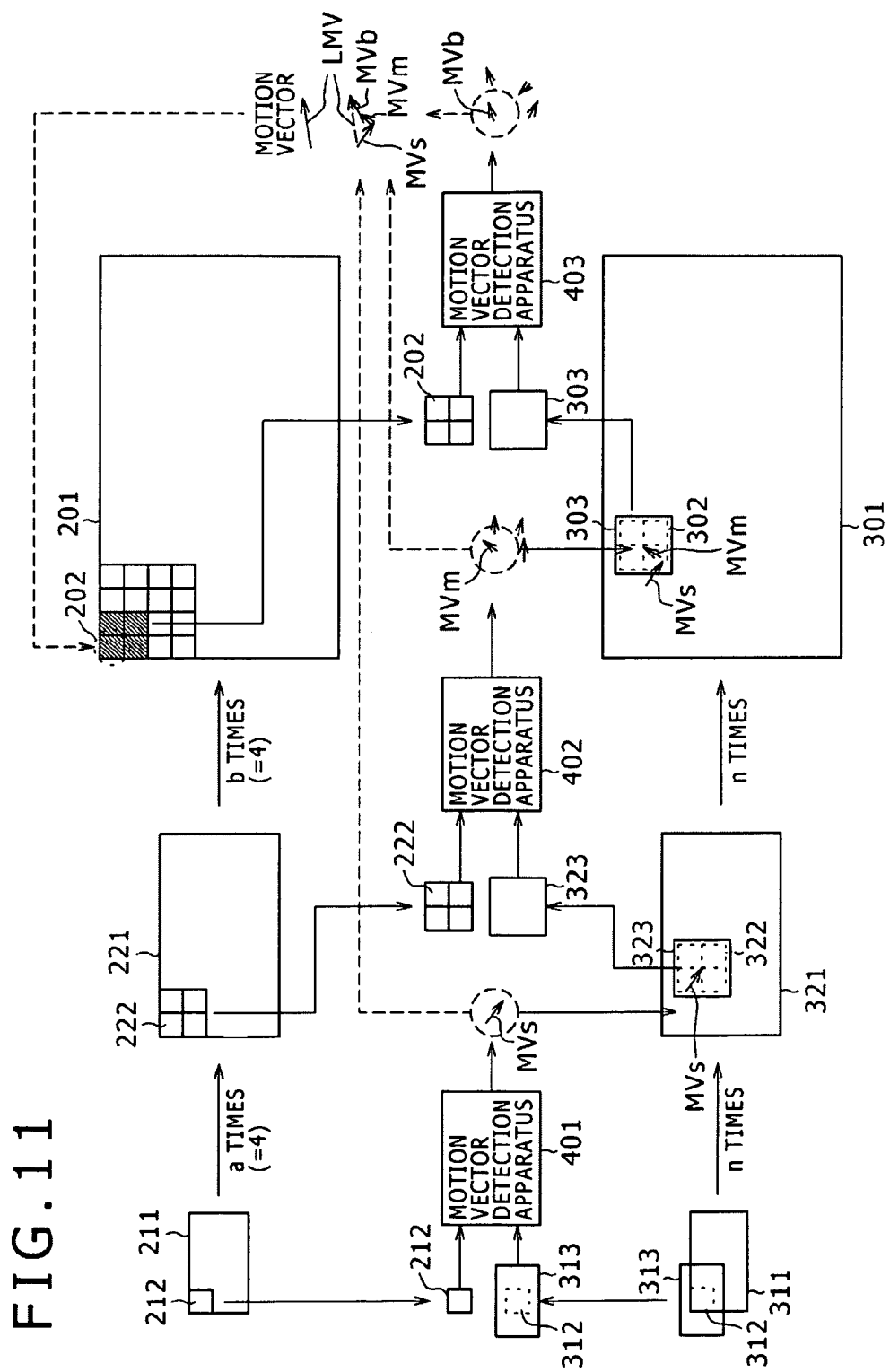
FIG. 11 is a block diagram illustrating the block matching process by the image processing apparatus.

FIG. 11 illustrates the layered block matching. Referring to FIG. 11, in the example illustrated, a base plane target frame 201 and a base plane reference frame 301 are reduced in size to 1/a·1/b (1/a and 1/b are reduction ratios where a>1 and b>1) to produce a reduction plane target frame 211 and a reduction plane reference frame 311, respectively.

Then, the base plane target frame 201 and the base plane reference frame 301 are reduced to 1/b to produce an intermediate plane target frame 221 and an intermediate plane reference frame 321, respectively.

Although arbitrary scales can be used for the reduction plane and the intermediate plane with respect to the base plane, they may be suitably set to ½ to ⅛ time, that is, ¼ to 1/64 time as converted into a pixel number. It is to be noted that, in the example of FIG. 11, the reduction ratio of the reduction plane to the intermediate plane is ¼, that is, a=4, and the reduction ratio of the intermediate plane to the base plane is ¼, that is, b=4.

Also for production of the reduction plane and the intermediate plane, an arbitrary method may be applied. However, if a method wherein pixels of an original image are merely sampled out in response to a reduction ratio to produce a reduction plane or an intermediate plane is applied, then reflection components are generated and a motion vector which is detected in the first layer (reduction plane) becomes likely to be displaced from a correct motion vector. Therefore, usually a low-pass filter having a cutoff frequency band suitable for a reduction ratio is applied to an original image first, and then the sampling suitable for the reduction ratio is carried out.

In the present embodiment, a luminance average value is calculated among pixels including those pixels which disappear by sampling in accordance with a scale and is used as a reduction plane pixel or an intermediate plane pixel. In particular, in the case of 1/a reduction, a luminance average value in a square region of a×a pixels is calculated and used as a luminance value of a reduction plane pixel or an intermediate plane pixel. In this instance, even if an intermediate plane is formed first and then a reduction plane is produced from the intermediate plane, a same result as that obtained where a reduction plane is produced immediately from an original screen image is obtained. Therefore, this method is higher in efficiency.

It is to be noted that, when a reduction image is to be produced, the reduction ratio in the horizontal direction and the reduction radio in the vertical direction may be same as in the case described above or may otherwise be different from each other.

After a reduction plane and an intermediate plane are produced in such a manner as described above, a reduction plane target block 212 is set to the reduction plane target frame 211 and a reduction plane search range 313 is set to the reduction plane reference frame 311 first.

Then, the block matching process is carried out for a plurality of reduction plane reference blocks 312 in the reduction plane search range 313 by a reduction plane motion vector detection apparatus 401 to detect a reduction plane reference block position which exhibits the lowest SAD value. Then, a reduction plane motion vector MVs is detected based on the detection of the reproduction plane reference block.

In the present example, the reduction plane motion vector detection apparatus 401 executes the processing for a block matching processing unit which is a block of a size of the reduction plane target block 212, that is, a block of the pixel number in the horizontal direction×line number in the vertical direction.

After the calculation of the reduction plane motion vector MVs ends, an intermediate plane target block 222 is set on the intermediate plane target frame 221 which is equal in size to the reduction plane target frame 211 multiplied by a.

In the example of FIG. 11, an intermediate plane motion vector detection apparatus 402 carries out the block matching process for an intermediate target block which is a block of a size same as that of the block matching processing unit of the reduction plane motion vector detection apparatus 401. The block of a same size is a block of an equal pixel number and includes an equal number of pixels in the horizontal direction×an equal number of lines in the same vertical direction.

In the case of the present example, since the reduction plane has a size of 1/a of the intermediate plane, the number of intermediate plane target blocks 222 included in a region of the intermediate plane target frame corresponding to the reduction plane target block 212 is a. Accordingly, all of the intermediate plane target blocks 222 are set as a block matching processing object of the intermediate plane motion vector detection apparatus 402.

Then, in the intermediate plane reference frame 321 having a size equal to a times that of the reduction plane reference frame 311, an intermediate plane search range 323 centered at the reduction plane motion vector MVs is set. Then, the block matching process described above is carried out by the motion vector detection apparatus 402 for a plurality of intermediate plane reference blocks 322 within the intermediate plane search range 323 to detect an intermediate plane reference block position which exhibits the lowest SAD value to detect an intermediate plane motion vector MVm.

The intermediate plane motion vector detection apparatus 402 executes the block matching process, for each of the a intermediate plane target blocks, in the search range for each of the intermediate plane target blocks set in the intermediate plane search range 323 thereby to detect a motion vector of each of the intermediate plane target blocks. Then, that one of the plural motion vectors which exhibits the lowest SAD value is detected as the motion vector MVm of the intermediate plane, that is, as the intermediate plane motion vector.

After the calculation of the reduction plane motion vectors MVs ends, a base plane target block 202 is set in the base plane target frame 201 having a size equal to b times that of the intermediate plane target frame 221.

In the example of FIG. 11, also a base plane motion vector detection apparatus 403 carries out the block matching process for a processing unit block which is a block of a size same as those in the motion vector detection apparatus 401 and 402, that is, of an equal pixel number=equal pixel number in the horizontal direction×equal line number in the vertical direction.

Then, the intermediate plane motion vector MVm is obtained in a unit of a processing unit block as described hereinabove. Accordingly, the number of base plane target blocks 202 of the base plane target frame 201 which is an object of the base plane motion vector detection apparatus 403 is set so as to be equal to b times the number of blocks, that is, processing unit blocks, of a size equal to that of the reduction plane as indicated by slanting lines in FIG. 11.

On the other hand, in the base plane reference frame 301 having a size equal to b times that of the intermediate plane reference frame 321, a base plane search range 303 centered at a composite vector of the reduction plane motion vector MVs and the intermediate plane motion vector MVm is set. The block matching process described above is carried out for a plurality of base plane reference blocks 302 in the base plane search range 303 by the base plane motion vector detection apparatus 403 to detect the position of a base plane reference block which exhibits the lowest SAD value to detect a base plane motion vector MVb.

The reduction plane motion vector MVs and the intermediate plane motion vector MVm are obtained in a unit of a processing unit block of the same size. Therefore, the base plane search range 303 set centered at the composite vector of the reduction plane motion vector MVs and the intermediate plane motion vector MVm is a little greater than the region which includes the b base plane target blocks 202.

The base plane motion vector detection apparatus 403 executes the block matching process in a search range in the base plane target blocks set in the base plane search range 303 for the b base plane target blocks 202 thereby to carry out detection of a motion vector of the base plane target blocks. Then, that one of the plural motion vectors which exhibits the lowest SAD value is detected as a base plane motion vector MVb, that is, a base plane motion vector of the base plane.

Then, as a composite vector of the reduction plane motion vector MVs, intermediate plane motion vector MVm and base plane motion vector MVb determined in such a manner as described above, a local motion vector LMV of the base plane target block between the base plane target frame 201 and the base plane reference frame 301 is detected.

Such a layered block matching process as described above is executed for all regions of the target frame and the reference frame while the target block and the reference block are successively changed over thereby to calculate all of a plurality of local motion vectors LMV in a unit of a plurality of target blocks set in the target frame.

In the example of FIG. 11, the motion vector detection apparatus 401, 402 and 403 actually are a substantially one apparatus but are different among them in the target block read out from the image memory unit 4 and inputted and the reference block read out from within the search range.

It is to be noted that, where the base plane target frame 201 is configured so as to obtain the local motion vector LMV of all of the base plane target blocks 202, the changeover of the target block should be carried out in the following manner. In particular, the reduction plane target block is set, on the reduction plane, while successively displacing the reduction plane, in the horizontal direction, by an amount corresponding to the number of pixels in the horizontal direction in accordance with the scales 1/a and 1/b. Meanwhile, in the vertical direction, the reduction plane target block is set while successively displacing the reduction plane by an amount corresponding to the number of lines in the vertical direction in accordance with the scales 1/a and 1/b.

However, from the object that a global motion vector is determined from a plurality of local motion vectors LMV, the following countermeasure may be taken. In particular, the reduction plane target block is set successively displacing the same in the horizontal direction and the vertical direction such that the local motion vector LMV is obtained regarding the base plane target blocks at skipping positions of the base plane target frame 201.

It is to be noted that the layered block matching described above may otherwise be carried out only with two layered of the reduction plane and the base plane with the intermediate plane omitted, or may include a plurality of intermediate layers for different intermediate planes. However, if the reduction ratio is so high that a moving image pickup object and the background are included in the same unit block, then care must be taken. In particular, motion vectors which should originally be detected as different motion vectors are handled as a single motion vector, and since recovery is impossible in later layers, selection of the reduction ratio must be carried out carefully.

Figure 12:
FIG. 12 is a schematic view showing an example of a picked up image to which an image processing method according to an embodiment.
Figure 13:
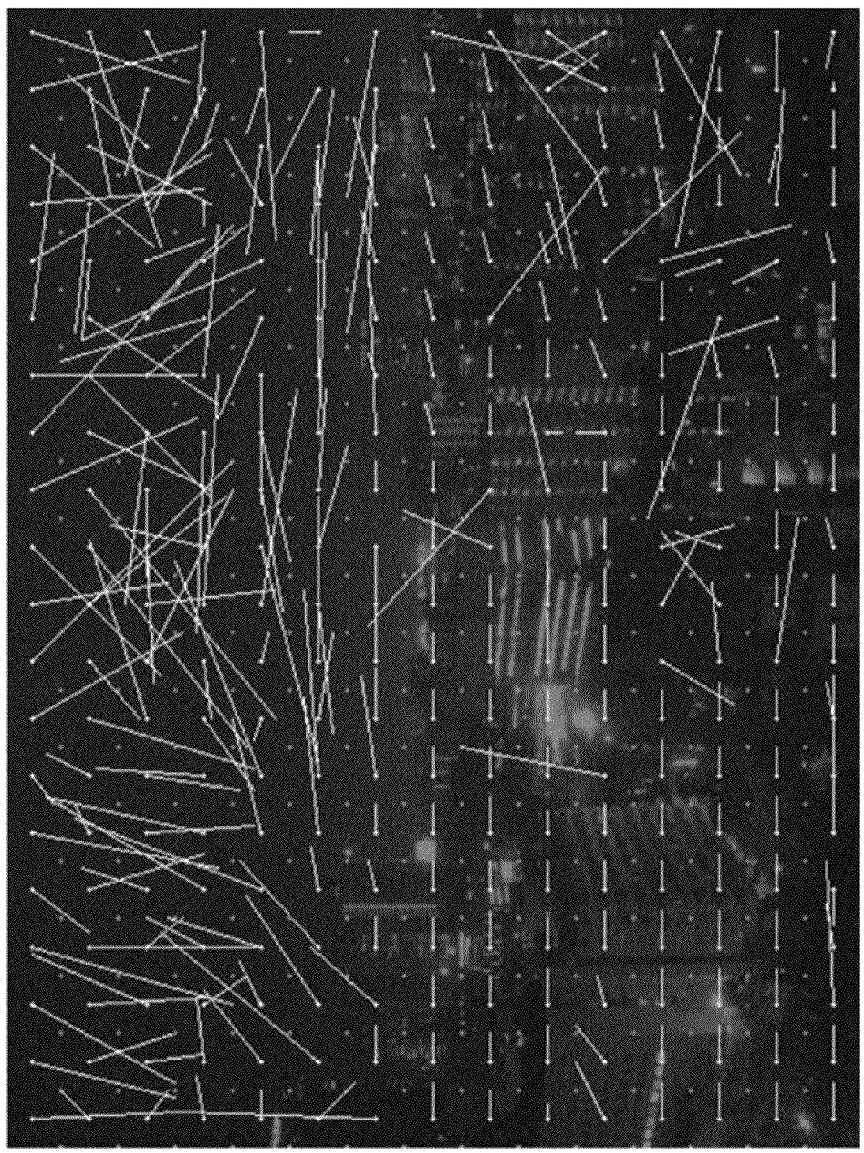
FIG. 13 is a schematic view showing local motion vectors detected using the image processing method in an associated relationship with the picked up image of FIG. 12.

[Calculation of Reliability of the Local Motion Vector LMV]

Where an image having a comparatively great amount of noise is a target image, frequently a correct vector cannot be obtained because the SAD value is influenced by the noise. FIG. 12 is a photograph of a night view, which includes a comparatively great amount of noise. If motion vectors between the image of FIG. 12 and an image picked up with camera shake in the leftward direction while a very small amount of rotation is involved are illustrated, then such a result as shown in FIG. 13 is obtained. FIG. 13 is obtained by plotting reduction plane motion vectors of a reduced image obtained by reducing the original picture to ⅛.

As can be seen from FIG. 13, motion vectors of the night sky whose texture is not particularly clear are obtained as quite diverse motions. In the layered block matching, since a low-pass filter is applied upon production of a reduced image, the noise resisting property is comparatively high. However, the reduced image is influenced by noise as seen in FIG. 13.

Since the local motion vector LMV of the base plane is obtained by search around a reduction plane motion vector, if the reduce screen image motion vector is displaced from a correct motion vector, then recovery is ineffective and the reduction plane motion vector is influenced directly by noise and is further disordered.

Even if a picked up image having no noise at all is an object image, if the texture of the image is not clear, then the variation of the gradation by a small variation of external light upon consecutive shooting image pickup or a difference in exposure time is greater, and the detected motion vector is frequently displaced from a correct value. Further, while a large number of trees or artificial structures such as buildings have many repeated patterns of a texture, even with such a repeated pattern of a texture as just described, a detected motion vector is likely to be displaced from a correct value.

Assuming such a case as just described, an attempt of calculating a global motion using only motion vectors having high reliability has been used in related art. For example, it has been proposed to carry out edge detection of a target image and determine a motion vector of a block having a clear edge as a motion vector having high reliability. Also it has been proposed to calculate reliability using a DC component and AC component of a result of IDCT (Inverse Discrete Cosine Transform) of a target image.

Also a method has been proposed wherein characteristic points on a target image are detected using a corner detector which is a kind of filter so that resulting motion vectors have high reliability. Also a technique has been proposed to extract, from an assumption that a positional relationship of a plurality of characteristic points is maintained also on a reference image, a motion vector of high reliability from a combination of a plurality of motion vectors at different points.

However, such techniques in related art as described above do not assume an image of high noise and apparently fail with an image having noise of a very high level.

In the present embodiment, taking the foregoing situation described above into consideration, a countermeasure is taken to obtain a reliability index value with which the reliability of a motion vector even of an image in a high noise environment can be evaluated effectively.

In the present embodiment, the difference or ratio of a first maximum value and a second maximum value from among correlation values between a target block and a reference block is used as an index value to the reliability of a motion vector. In the present embodiment, since a correlation value between the target block and the reference block is detected as a SAD value, the first maximum value and the second maximum value of the correlation value are a first minimum value and a second minimum value of the SAD value, respectively.

Figure 14:
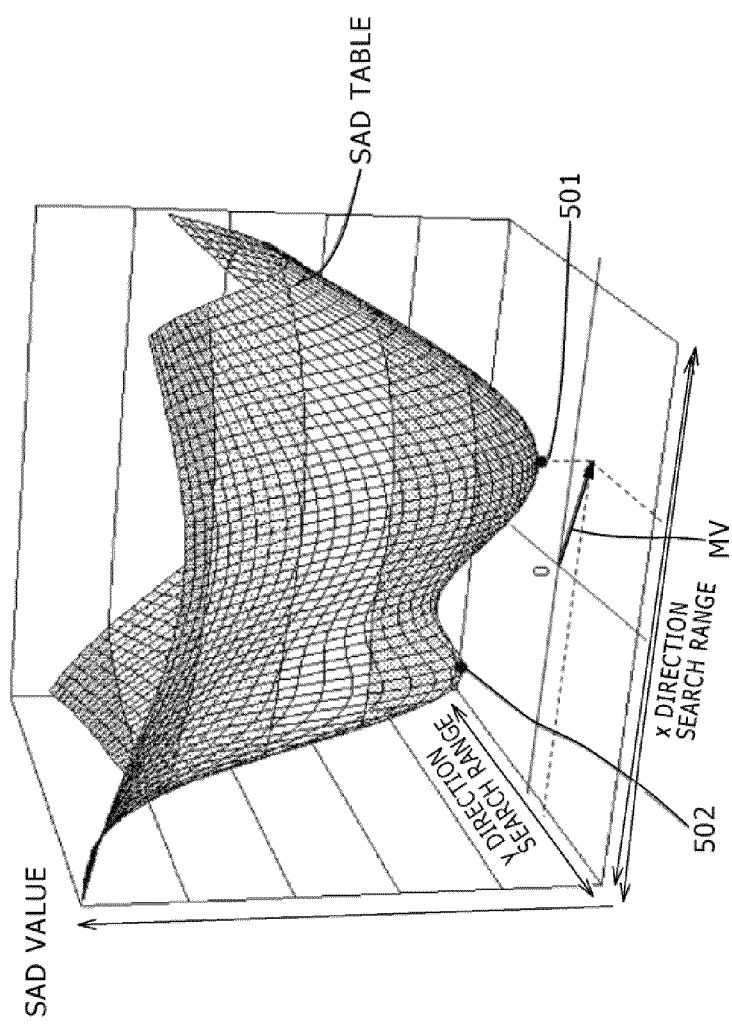
FIG. 14 is a diagrammatic view illustrating a SAD table used in the image processing method.

FIG. 14 schematically illustrates SAD values of a SAD table regarding one target block. In FIG. 14, the search range is represented as a two-dimensional range in the horizontal direction or x direction and the vertical direction or y direction of the image, and the SAD values are taken in the heightwise direction, that is, in a direction perpendicular to the x and y directions. Consequently, the SAD table is represented as a cubic curved face.

In an ordinary block matching process, in order to detect a motion vector, only the lowest value of the SAD value in the SAD table is determined as a detection object. However, this lowest value of the SAD value is the first minimum value of the SAD value in the SAD table, and in FIG. 14, the value assumes the position represented by a point 501. In FIG. 14, a motion vector MV is detected as a vector from the origin of the movement, that is, (x=0, y=0) to the minimum value position of the SAD value indicated by the point 501.

If an ideal state in which no noise exists is considered, then when a correlation value between a plurality of reference blocks and a target block within a search range is determined, the SAD table represented by a cubic curved face exhibits a state wherein the cubic curved face is uniformly downwardly convex and only one minimum value of the SAD value exists. However, in an actual image pickup situation, the SAD table represented by an cubic curved face scarcely indicates a uniformly downwardly convex shape but usually has a plurality of minimum values of the SAD value because not only of an influence of a light amount variation, a motion of a moving body or the like but also of various kinds of noise.

Therefore, in the present embodiment, the motion vector MV is detected based on the position of a reference block which exhibits the first minimum value equal to the lowest value of the SAD value. However, a minimum value from among the SAD values except the first minimum value of the SAD value, that is, the second minimum value of the SAD value, is detected for production of an index to the reliability. In FIG. 14, the position indicated by the point 501 represents the first minimum value, and the position indicated by another point 502 represents the second minimum value.

If the influence of noise and so forth is limited, then the difference between the first minimum value of the SAD value and the second minimum value of the SAD value is great, and the reliability of the motion vector MV detected from the first minimum value of the SAD value, that is, from the lowest value of the SAD value, is high. On the other hand, in another environment which includes much noise and so forth, the difference between the first minimum value of the SAD value and the second minimum value of the SAD value is small, and it cannot be discriminated which one of the first and second minimum values of the SAD value corresponds correctly to the motion vector MV. Therefore, the reliability is low.

Figure 15:
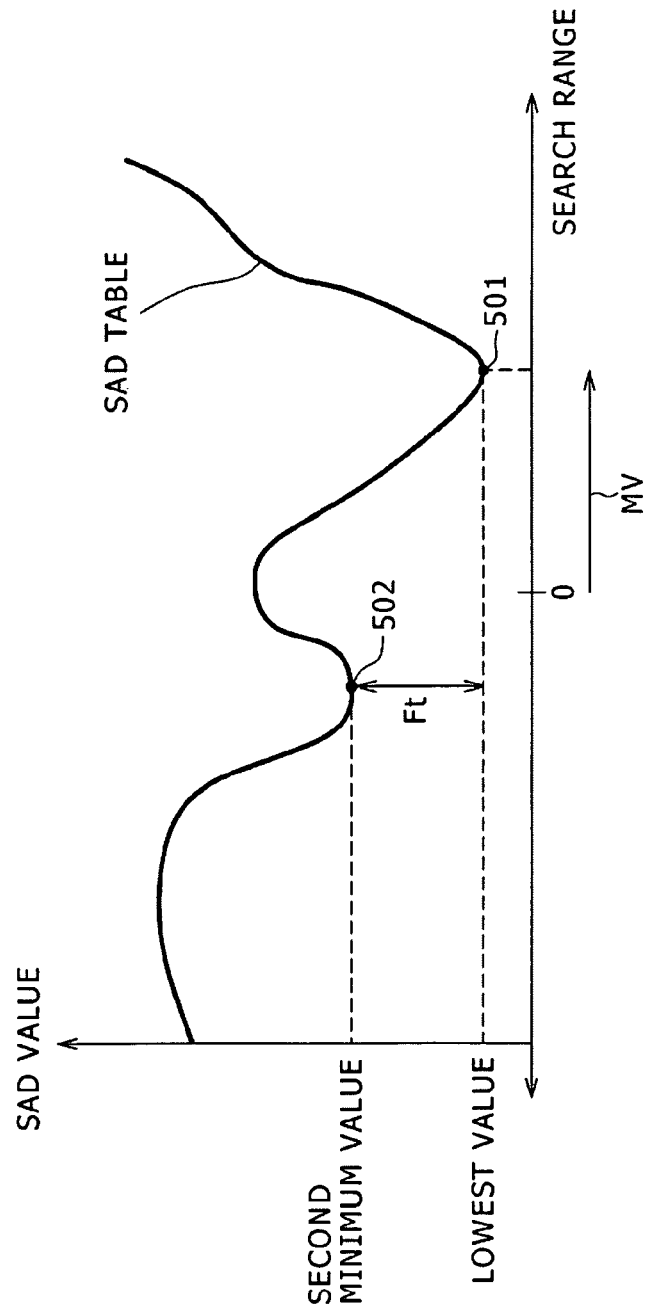
FIG. 15 is a diagrammatic view showing the SAD table of FIG. 14 taken on a one-dimensional axis.

From the foregoing, in the present embodiment, the difference between the first minimum value of the SAD value (lowest value of the SAD value) and the second minimum value of the SAD value is determined as an index to the reliability of the detected motion vector. A SAD table wherein the search range in FIG. 14 is represented on a one-dimensional axis is illustrated in FIG. 15. In the present embodiment, the value of the difference between the second minimum value and the first minimum value, that is, the lowest value of the SAD value, in FIG. 15 is determined as an index value Ft of the motion vector MV.

It is to be noted that, where only a first minimum value of the SAD value is obtained but a second minimum value is not obtained, in the present embodiment, the theoretically highest value of the SAD value or the highest value of the SAD value in the SAD value table is determined as a reliability index value of the motion vector MV. Accordingly, it is determined that the motion vector of such a block as just described is high. However, since a block of the type described seldom exists, a motion vector of a block from which only the first minimum value of the SAD value is obtained but no second minimum value is obtained may be excluded from evaluation of the reliability.

It is to be noted that, in place of the difference between the first minimum value of the SAD value (lowest value of the SAD value) and the second minimum value of the SAD value, the ratio between the first minimum value of the SAD value (lowest value of the SAD value) and the second minimum value of the SAD value may be used as the index value Ft of the motion vector MV. However, in the following description, the difference between the first minimum value of the SAD value (lowest value of the SAD value) and the second minimum value of the SAD value is used.

According to the reliability index of a motion vector in the present embodiment, since not an image component such as an edge or a characteristic of an image as in the related art but only a correlation value between a target frame and a reference frame is used, the robustness against noise is high. In other words, a reliability index of a motion vector having high accuracy is obtained without being influenced by noise of an image.

Further, in the present embodiment, also that the difference or ratio between the first maximum value of the correlation value (first minimum value of the SAD value) and the second maximum value of the correlation value (second minimum value of the SAD value) is used makes a reason that the reliability index of the motion vector in the present embodiment has high robustness against noise.

In particular, if the noise level rises, then even if the motion vector is correct, generally the SAD value of the motion vector rises. Therefore, where a threshold value is set for the reliability index value Ft of the motion vector to carry out a comparison process with the threshold value in order to extract a motion vector having high reliability, it is necessary to vary also the threshold value itself in response to the noise level.

In contrast, where the index value Ft of the motion vector in the present embodiment is used, both of the first maximum value of the correlation value (first minimum value of the SAD value) and the second maximum value of the correlation value (second minimum value of the SAD value) rise in response to the noise level. Therefore, the influence of noise is canceled in the difference between the first maximum value of the correlation value (first minimum value of the SAD value) and the second maximum value of the correlation value.

In other words, a threshold value process of a fixed value which does not depend upon the noise level can be achieved. This similarly applies also where the ratio between the first maximum value of the correlation value (first minimum value of the SAD value) and the second maximum value of the correlation value (second minimum value of the SAD value) is used as the index value Ft of the motion vector.

Incidentally, where the contrast of an image of an object block for which block matching is to be carried out is low, the difference between the second minimum value of the SAD value and the lowest value of the SAD value has a tendency to decrease. Therefore, when the same frame includes a region having a high contrast and another region having a low contrast, if the same threshold value is used for evaluation of the evaluation value Ix of the vector reliability, then the region having the high contrast is likely to be selected preferentially.

Although this is a correct result from a point of view of reliability of the motion vector, in order to relieve regions having a low contrast to some degree, in the present embodiment, a term for moderating the influence of the contrast is added to a mathematical operation expression for determining an index value to the reliability of a motion vector. In particular, the difference between the value of the highest luminance and the value of the lowest luminance of an image of a target frame is determined, and the difference in luminance is reflected on the index value to the reliability of the motion vector. It is to be noted that, in order to avoid a bad influence of noise, extraction of the highest luminance and the lowest luminance is carried out after a low-pass filter is applied to image data of the target frame.

Taking the foregoing into consideration, the calculation expression of the index value Ft in the present embodiment is given as:

$$Ft=(Btm2SAD-MinSAD)-(MaxTAR-MinTAR) \times Co \quad \text{(expression 14)}$$

where
Ft: reliability index value of the motion vector
Btm2SAD: second minimum value of the SAD value
MinSAD: lowest value (first minimum value) of the SAD value
MaxTAR: highest luminance value of the target block
MinTAR: lowest luminance value of the target block
Co: weight coefficient ($\leq 1$)

It is to be noted that, also where the ratio between the first maximum value of the correlation value and the second maximum value of the correlation value is used as the motion vector reliability index value, a term for moderating the influence of the contrast may be added to the reliability index value calculation expression quite similarly to the (expression 1) given hereinabove. However, in calculation of the index value Ft of the motion vector, it is not essentially required to add a term for moderating the influence of the contrast, but the term may be omitted.

While, in the foregoing description, only the motion vector reliability index value of the base plane motion vector MVb is determined, naturally the motion vector reliability index value can be determined similarly also with regard to the reduction plane motion vector MVs or the intermediate plane motion vector MVm.

[Calculation of the Global Motion and the Global Motion Vector GVM]

In the related art, such a reliability index value of a motion vector as described above is not used. Therefore, all of a plurality of local motion vectors LMV determined with regard to a target frame are used with an equal weight to calculate a global motion.

In contrast, in the present embodiment, the reliability index value Ft of each of a plurality of local motion vectors LMV of a target frame can be obtained in such a manner as described above.

Then, the reliability index values of the plural local motion vectors LMV determined in this manner can be normalized to set a weight coefficient, for example, equal to or higher than 0 but equal to or lower than 1 to each of the local motion vectors LMV. Then, the local motion vectors LMV can be used not with an equal weight but with weights determined in accordance with the respective weighting coefficients to calculate the global motion. In particular, when all of the plural local motion vectors LMV determined are used to start a convergence calculation for calculating a global motion, the local motion vectors LMV thereupon are used after they are weighted with weight coefficients corresponding to the respective reliability index values.

However, in order to simplify the mathematic operation process of the global motion to reduce the mathematic operation load, in the present embodiment, the weighting coefficients W of the local motion vectors LMV are binarized to 0 and 1.

Therefore, in the present embodiment, a threshold value th for the index value Ft of the motion vector is set, and the weighting coefficient W of each local motion vector LMV is calculated using the index value Ft of each motion vector in accordance with the mathematic operation expressions:

when Ft>th, W=1, but when Ft≦th, W=0         (expression 15)

In particular, in the present embodiment, the motion vector reliability index value Ft is used to decide the reliability of each of a plurality of local motion vectors LMV and only those local motion vectors LMV which have high reliability are extracted from among the plural local motion vectors LMV. Then, only the extracted local motion vectors LMV having high reliability are used to calculate the global motion.

In the present embodiment, since the number of target blocks in a target frame is comparatively great, even where a method of extracting only the local motion vectors LMV having high reliability as in the present example is used, a global motion having high accuracy can be calculated.

It is to be noted that a particular processing example of calculating a global motion from a plurality of local motion vectors LMV is hereinafter described.

Figure 16:
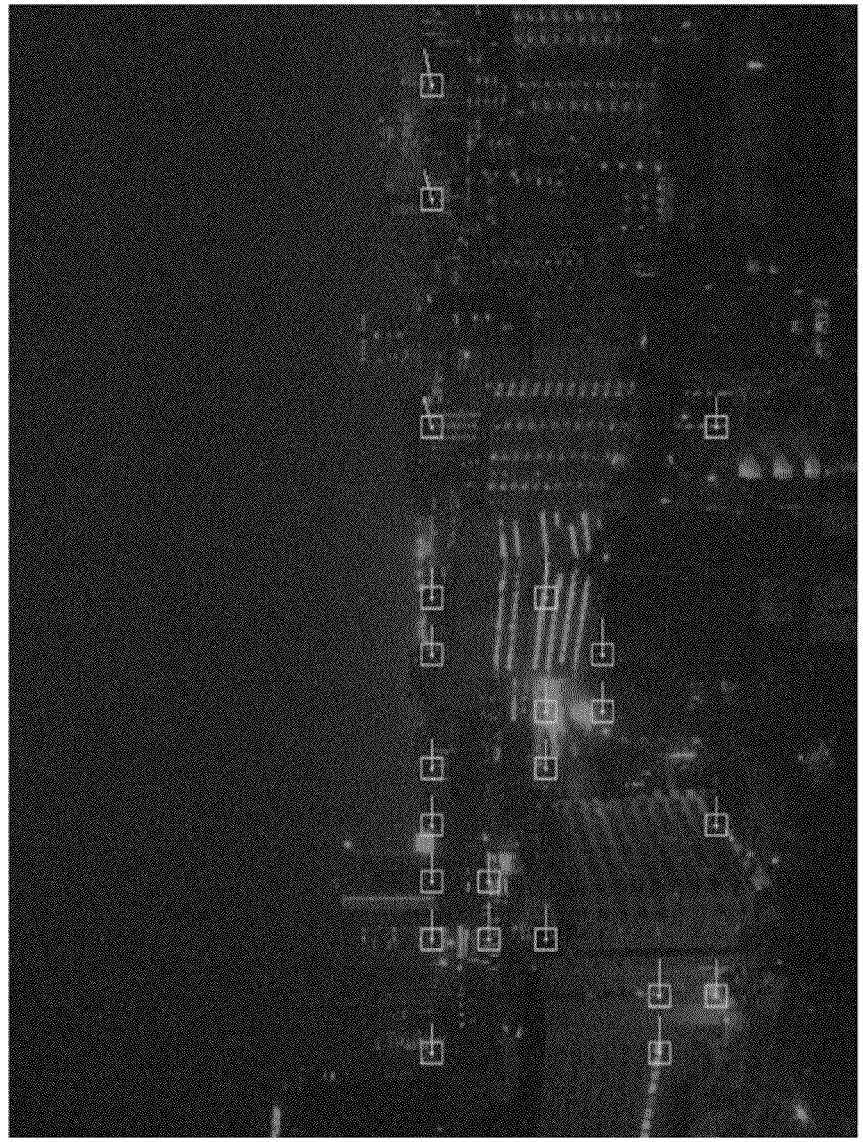
FIG. 16 is a view illustrating local motion vectors, which are determined to have high reliability by the image processing method, in an associated relationship the picked up image of FIG. 12.

It is described above that such local motion vectors as illustrated in FIG. 13 are obtained from the image having a great amount of noise described hereinabove with reference to FIG. 12. However, if decision of the reliability is carried out for the local motion vectors indicated on the image of FIG. 13 using the reliability index value of the motion vector according to the present embodiment to extract only those reliability index values which have reliability higher than a threshold value and then the blocks and the motion vectors are plotted, then such an image as seen in FIG. 16 is obtained. It is considered that, as regards the blocks shown in FIG. 16, substantially correct local motion vectors are obtained without being influenced by noise.

[Example of the Hardware Configuration of the Global Motion Vector Calculation Section 15]

The global motion vector calculation section 15 carries out such processes as detection of a local motion vector LMV for each target block, calculation of a reliability index value to the detected local motion vector LMV, calculation of a global motion and a global motion vector GVM and so forth as described hereinabove.

Figure 17:
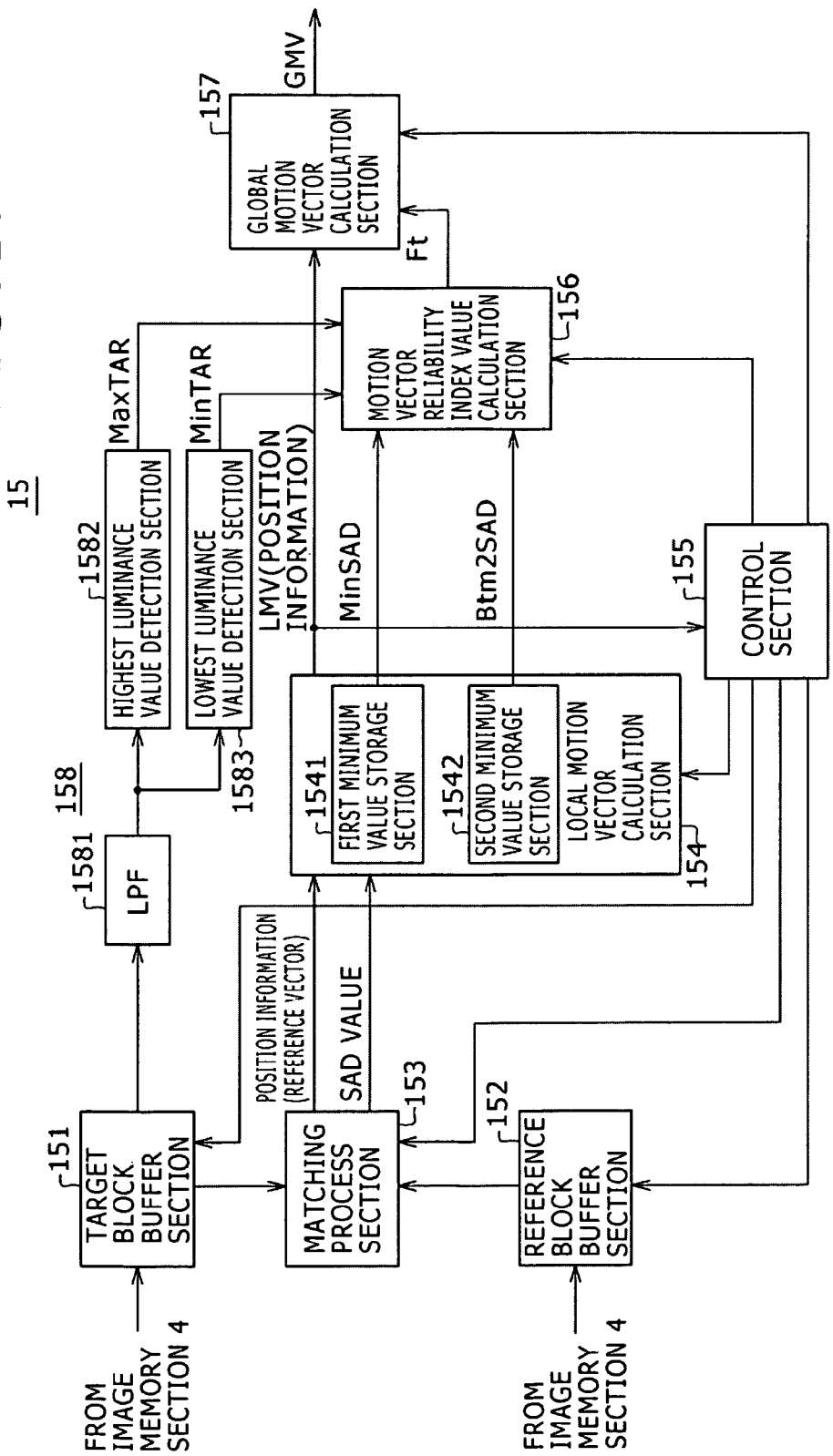
FIG. 17 is a block diagram showing an example of a configuration of a global motion vector calculation block of the image processing apparatus.

An example of the hardware configuration of the global motion vector calculation section 15 is shown in FIG. 17. Referring to FIG. 17, the global motion vector calculation section 15 includes a target block buffer section 151 configured to store pixel data of a target block 102, and a reference block buffer section 152 configured to store pixel data of reference blocks 108.

The global motion vector detection section 15 further includes a matching processing section 153 configured to calculate the SAD value of corresponding pixels of the target block 102 and the reference blocks 108. The global motion vector detection section 15 further includes a local motion vector calculation section 154 configured to calculate local motion vectors from SAD value information outputted from the matching processing section 153. The global motion vector detection section 15 further includes a control section 155, a motion vector reliability index value calculation section 156, a global motion vector mathematic operation section 157 and a contrast calculation section 158.

The contrast calculation section 158 includes a low-pass filter 1581, a highest luminance value detection section 1582 and a lowest luminance value detection section 1583.

Further, though not shown, in the present example, image data of the reduction plane and image data of the intermediate plane of a target frame and a reference frame produced from image data of a target frame and a reference frame of an original picture are stored and retained in the image memory unit 4.

The control section 155 controls a processing sequence of the global motion vector calculation section 15 and supplies control signals to the components of the global motion vector calculation section 15 as seen in FIG. 17.

The target block buffer section 151 reads in image data of a designated target block from image data of a target frame of the reduction plane, intermediate plane or base plane of the image memory unit 4 and supplies the image data to the matching processing section 153 under the control of the control section 155.

The reference block buffer section 152 reads in image data within a designated matching processing range from among the image data of a reference frame of the reduction plane, intermediate plane or base plane of the image memory unit 4 under the control of the control section 155. Then, the reference block buffer section 152 supplies the image data of the reference block successively from among the image data within the matching processing range to the matching processing section 153.

The matching processing section 153 receives the image data of the target block from the target block buffer section 151 and the image data of the reference block from the reference block buffer section 152. Then, the matching processing section 153 carries out the block matching process for the reduction plane, intermediate plane and base plane under the control of the control section 155. Then, the matching processing section 153 supplies a reference vector, that is, position information of the reference block, and a SAD value of a result of the block matching process to the local motion vector calculation section 154.

The local motion vector calculation section 154 includes a first minimum value storage section 1541 for a SAD value and a second minimum value storage section 1542 for a SAD value and carries out a process of detecting a first minimum value of the SAD value and a second minimum value of the SAD value from among the SAD values from the matching processing section 153.

Then, the local motion vector calculation section 154 successively updates the first minimum value of the SAD value in the first minimum value storage section 1541 for a SAD value and position information, that is, a reference vector, of the first minimum value of the SAD value and the second minimum value of the SAD value in the second minimum value storage section 1542 for a SAD value and position information, that is, a reference vector, of the second minimum value of the SAD value. The local motion vector calculation section 154 carries out this updating process until the block matching process for all reference blocks in the matching processing range ends.

Then, when the block matching process ends, the first minimum value of the SAD value of the target block at the point of time and the position information or reference vector of the first minimum value of the SAD value are stored into the first minimum value storage section 1541 for a SAD value. Further, the second minimum value of the SAD value and the position information or reference vector of the second minimum value of the SAD value are stored into the second minimum value storage section 1542.

Then, when the block matching process for all of the reference blocks within the matching processing range ends, the local motion vector calculation section 154 detects the information of the reference vector, that is, the position information, stored in the first minimum value storage section 1541 for a SAD value as a motion vector in each of the reduction plane, intermediate plane and base plane. The processing operation of the local motion vector calculation section 154 is hereinafter described in detail.

The local motion vector calculation section 154 in the present embodiment supplies, upon reduction plane matching processing, a reduction plane motion vector MVs as a local motion vector LMV to the control section 155.

The control section 155 determines a search range for the intermediate plane from the information of the reduction plane motion vector MVs. Then, the control section 155 supplies control signals to the target block buffer section 151, reference block buffer section 152 and matching processing section 153 so that they carry out block matching in the intermediate plane.

Then, when the matching process in the intermediate plane ends, the local motion vector calculation section 154 supplies information of a composite vector of the reduction plane motion vector MVs and the intermediate plane motion vector MVm as the local motion vector LMV to the control section 155.

The control section 155 determines a search range for the base planes from the information of the composite vector of the reduction plane motion vector MVs and the intermediate plane motion vector MVm. Then, the control section 155 supplies control signals to the target block buffer section 151, reference block buffer section 152 and matching processing section 153 so that they carry out block matching in the base plane.

When the matching process in the base plane ends, the local motion vector calculation section 154 supplies information of the composite vector of the reduction plane motion vector MVs, intermediate plane motion vector MVm and base plane motion vector MVb as a local motion vector LMV to the global motion vector mathematic operation section 157. The global motion vector mathematic operation section 157 temporarily stores the received local motion vector LMV.

Further, when the matching process in the base plane ends, the motion vector reliability index value calculation section 156 is enabled by the control section 155. Meanwhile, the lowest value MinSAD of the SAD value of the first minimum value storage section 1541 and the second minimum value Btm2SAD of the SAD value of the second minimum value storage section 1542 are supplied from the local motion vector calculation section 154 to the motion vector reliability index value calculation section 156.

Further, at this time, the image data of the target block are supplied from the target block buffer section 151 to the highest luminance value detection section 1582 and the lowest luminance value detection section 1583 through the low-pass filter 1581. Then, the highest luminance value MaxTAR and the lowest luminance value MinTAR detected by the highest luminance value detection section 1582 and the lowest luminance value detection section 1583, respectively, are supplied to the motion vector reliability index value calculation section 156.

The motion vector reliability index value calculation section 156 uses the information supplied thereto to calculate the reliability index value Ft of the motion vector in accordance with the (expression 1) given hereinabove. Then, the motion vector reliability index value calculation section 156 supplies the calculated reliability index value Ft to the global motion vector mathematic operation section 157. The global motion vector mathematic operation section 157 temporarily stores the reliability index value Ft inputted thereto in an associated relationship with the local motion vector LMV supplied thereto at this time.

After the series of processes described above ends for all of the target blocks in the target frame, the control section 155 supplies a control instruction signal to the global motion vector mathematic operation section 157 to start a mathematic operation process of the global motion.

In the present embodiment, the global motion vector mathematic operation section 157 first carries out, in accordance with the control instruction signal from the control section 155, decision of the reliability of a plurality of local motion vectors LMV stored therein in accordance with the (expression 2) given hereinabove using the motion vector reliability index values Ft stored in a corresponding relationship to the local motion vectors LMV. Then, the global motion vector mathematic operation section 157 extracts only those local motion vectors LMV which indicate high reliability.

Then, the global motion vector mathematic operation section 157 executes a mathematic operation process of calculating a global motion using only the extracted local motion vectors LMV which have high reliability. Then, the global motion vector mathematic operation section 157 calculates the resulting global motion vector GVM from the calculated global motion and supplies the resulting global motion vector GVM to the motion compensation picture production section 16.

The motion compensation picture production section 16 carries out a transformation process corresponding to the global motion with the global motion vector GVM for the image data REFv of the reference frame sent thereto through the global motion vector calculation section 15 to produce a motion compensation image. Then, the produced motion compensation image is superposed on the image data of the target frame by the addition section 17.

Since the global motion and the global motion vector GVM in the present embodiment are produced from the local motion vectors LMV having high reliability, they have high accuracy, and a reduced noise image obtained by the superposition is good in quality.

[Processing Operation of the Local Motion Vector Calculation Section 154]

Figure 18:
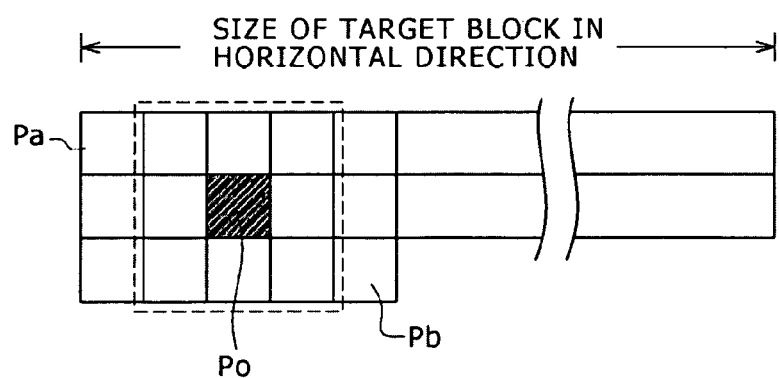
FIG. 18 is a diagrammatic view illustrating operation of the global motion vector calculation section.

The local motion vector calculation section 154 in the present embodiment determines, in order to detect a minimum value of the SAD value, a position Po as a decision object point and carries out comparison between the SAD value at the decision object point position Po and eight SAD values in the proximity of and around the decision object point position Po surrounded by a broken line framework in FIG. 18. Then, the local motion vector calculation section 154 decides whether or not the SAD value of the decision object point is the lowest value (hereinafter referred to as local minimum value) from among the nine SAD values in the region surrounded by the broken line framework.

Then, if the SAD value of the decision object point is determined as a local minimum value, then the local motion vector calculation section 154 compares the SAD value of the decision object point with the minimum value of the SAD value stored till then. Then, if the local motion vector calculation section 154 decides that the SAD value of the decision object point is lower than the minimum value of the SAD value stored till then, then it updates the minimum value of the SAD value stored therein with the newly detected local minimum SAD value.

As a configuration for detecting such a local minimum SAD value as described above, the local motion vector calculation section 154 is devised so as to decrease the scale of the buffer memory for the SAD table for storing SAD values. In particular, when the local motion vector calculation section 154 searches the reference block in a unit of one pixel, a buffer memory which can store SAD values for two lines of the size of the target block in the horizontal direction+three SAD values is prepared as the buffer memory for the SAD table for storing SAD values as seen in FIG. 18.

As can be seen from FIG. 18, if SAD values for two lines of the size of the target block in the horizontal direction+three SAD values are written into the buffer memory, then it is possible to decide the local minimum value at the decision object point position Po.

In order to minimize the size of the buffer memory, a newly inputted SAD value is overwritten at a memory position Pa at which an old SAD value which is not used for minimum value evaluation or local minimum value detection any more has been stored as seen in FIG. 18. In particular, although the newly inputted SAD value is to be written into a memory position Pb shown in FIG. 18 in accordance with the order, not the memory position Pb but the memory position Pa which is not used any more is re-utilized to suppress increase of the hardware scale of the memory.

It is to be noted that the local motion vector calculation section 154 includes the first minimum value storage section 1541 and second minimum value storage section 1542 described hereinabove in addition to the buffer for storing a local minimum value.

Such a series of processes as described above is a basic process, and this basic process is applied to the first minimum value and the second minimum value to detect the lowest value of the SAD value and the second minimum value of the SAD value.

While, in the present embodiment, the local motion vector calculation section 154 carries out the same operation for the reduction plane, intermediate plane and base plane, it detects the local motion vector LMV and calculates the reliability index value of the local motion vector LMV on the base plane. Accordingly, the second minimum value of the SAD value is required only for the base plane, and the calculation and the storage of the second minimum value of the SAD value on the reduction plane and the intermediate plane may be omitted.

Figure 19:
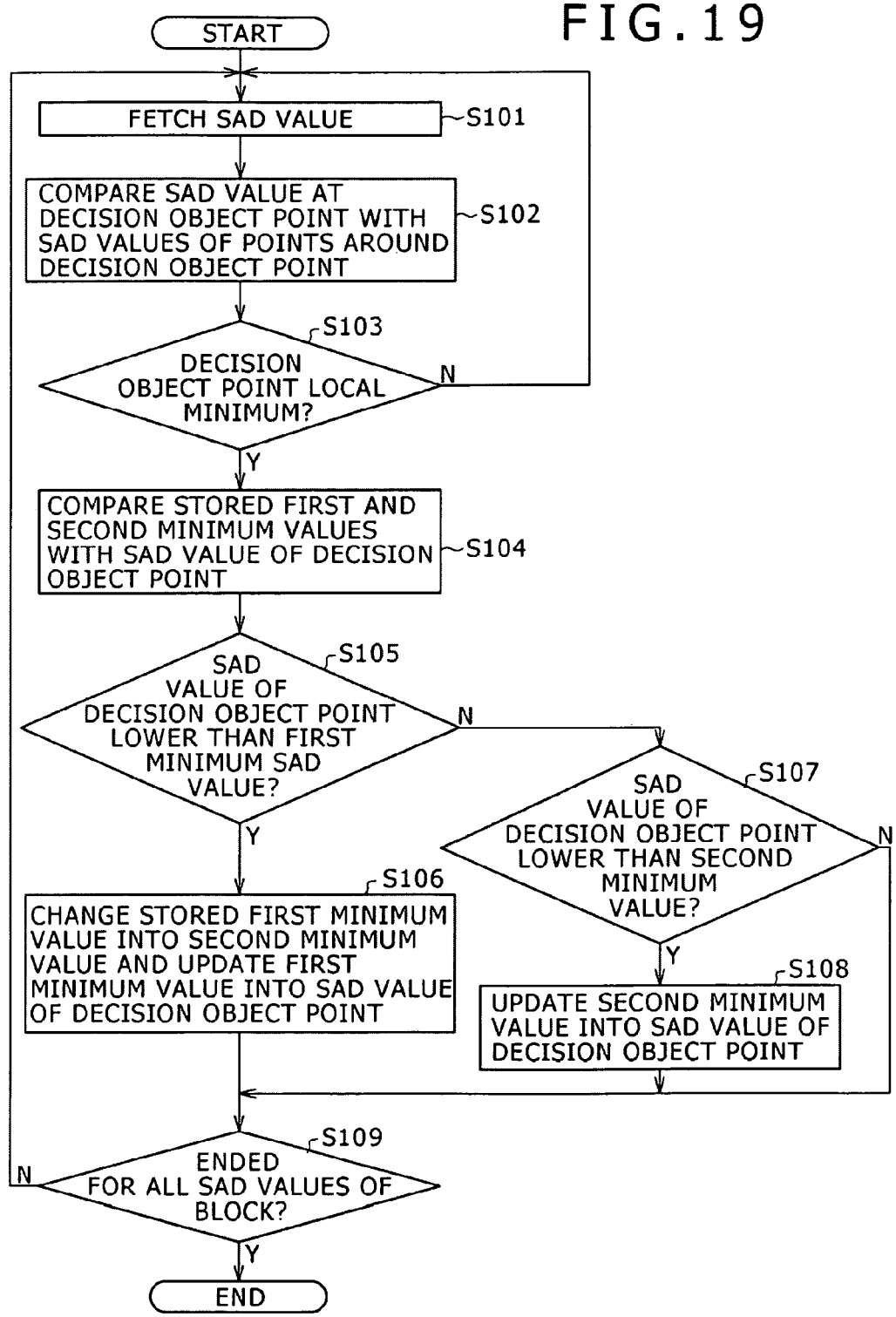
FIG. 19 is a flow chart illustrating an example of a detection processing operation by a local motion vector calculation block of the image processing apparatus.

FIG. 19 illustrates a flow of a detection processing operation of the first minimum value and the second minimum value by the local motion vector calculation section 154.

Referring to FIG. 19, the local motion vector calculation section 154 first fetches SAD values from the matching processing section 153 at step S101. Then, the local motion vector calculation section 154 compares the SAD value at the decision object point position Po and the eight SAD values at the positions surrounding the decision object point position Po with each other at step S102. Then, the local motion vector calculation section 154 decides based on a result of the comparison whether or not the SAD value at the decision object point position Po is a local minimum value at step S103.

If it is decided at step S103 that the SAD value at the positions surrounding the decision object point position Po is not a local minimum value, then the processing returns to step S101 to carry out fetching of next SAD values.

On the other hand, if it is decided at step S103 that the SAD value at the decision object point position Po is a local minimum value, then the local motion vector calculation section 154 compares the first minimum value and the second minimum value of the SAD value stored therein with the SAD value at the decision object point position Po at step S104.

Then, the local motion vector calculation section 154 decides whether or not the SAD value at the decision object point position Po is lower than the first minimum value of the SAD value stored therein at step S105. Then, if it is decided that the SAD value at the decision object point position Po is lower, then the local motion vector calculation section 154 updates the second minimum value storage section 1542 with the SAD value stored in the first minimum value storage section 1541 and stores the SAD value at the decision object point position Po into the first minimum value storage section 1541 at step S106.

Then, the local motion vector calculation section 154 decides whether or not the calculation process of the SAD value with regard to all of the reference blocks is completed with the target block at step S109. If it is decided that the calculation process is not completed as yet, then the processing returns to step S101, at which next SAD values are fetched. On the other hand, if it is decided at step S109 that the calculation process of the SAD value with regard to all of the reference blocks is completed with the target block, then the local motion vector calculation section 154 ends the processing routine.

On the other hand, if it is decided at step S105 that the SAD value at the decision object point position Po is equal to or higher than the first minimum value of the SAD value stored therein, then the local motion vector calculation section 154 decides whether or not the SAD value at the decision object point position Po is lower than the second minimum value of the SAD value stored therein at step S107. If it is decided that the SAD value at the decision object point position Po is lower, then the local motion vector calculation section 154 updates the SAD value stored in the second minimum value storage section 1542 with the SAD value at the decision object point position Po at step S108.

The processing advances from step S108 to step S109, at which the local motion vector calculation section 154 decides whether or not the calculation process of the SAD value with regard to all of the reference blocks is completed. If it is decided that the calculation process is not completed as yet, then the processing returns to step S101 to fetch next SAD values. On the other hand, if it is decided at step S109 that the calculation process of the SAD value with regard to all of the reference blocks for the target block is completed, then the processing routine is ended.

On the other hand, if it is decided at step S107 that the SAD value at the decision object point position Po is not lower than the second minimum value of the SAD value stored therein, then the processing advances to step S109, at which the local motion vector calculation section 154 decides whether or not the calculation process of the SAD value with regard to all of the reference blocks for the target block is completed. If it is decided that the calculation process is not completed as yet, then the processing returns to step S101 to fetch next SAD values. On the other hand, if it is decided at step S109 that the calculation process of the SAD value with regard to all of the reference blocks for the target block is completed, then the processing routine is ended.

The processing flow chart illustrated in FIG. 19 can be applied similarly among the reduction plane, intermediate plane and base plane. In this instance, with regard to the reduction plane and the intermediate plane, the SAD value stored finally in the first minimum value storage section 1541 is detected as the lowest value MinSAD of the SAD value, and corresponding reference vectors are detected as the reduction plane motion vector MVs and the intermediate plane motion vector MVm, respectively. Then, the lowest value MinSAD and the reduction plane motion vector MVs and intermediate plane motion vector MVm are outputted.

On the other hand, with regard to the base plane, the SAD value finally stored in the first minimum value storage section 1541 is detected as the lowest value MinSAD of the SAD value, and the corresponding reference vector is detected as the base plane motion vector MVb. Then, the lowest value MinSAD of the SAD value and the base plane motion vector MVb are outputted. Further, with regard to the base plane, the SAD value finally stored in the first minimum value storage section 1541, that is, the lowest value MinSAD, and the SAD value finally stored in the second minimum value storage section 1542, that is, the second minimum value of the SAD value, are supplied to the motion vector reliability index value calculation section 156.

[Processing Operation of the Global Motion Vector Calculation Section 157]

<Extended Affine Transformation>

Figure 20:
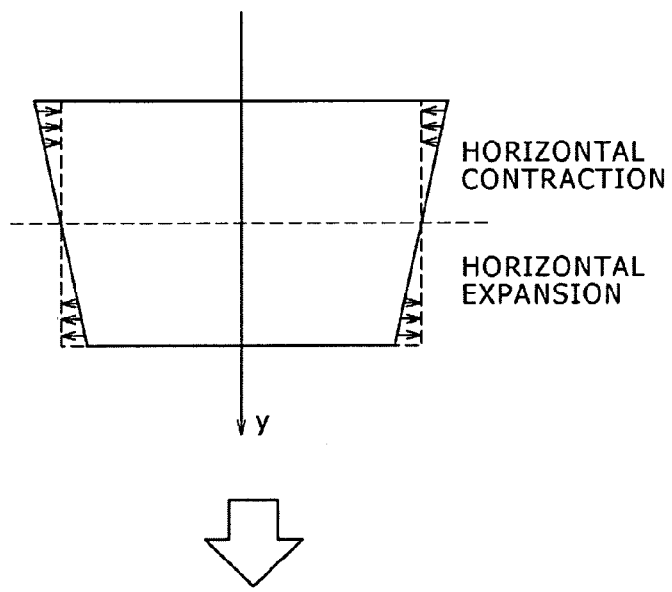
FIG. 20 is a schematic view illustrating ordinary affine transformation.

In the present embodiment, a global motion is calculated or estimated from a large number of local motion vectors LMV. Then, from the calculated global motion, a global motion vector GVM is calculated or a global motion is estimated. In this instance, a method of representing the global motion by affine transformation is used. However, in the present embodiment, extended affine transformation which is a modified form of ordinary affine transformation in related art is used.

Where it is tried to carry out "oblique distortion" correction of returning such an "obliquely distorted" trapezoidal image as indicated by solid lines in FIG. 20 to such a rectangular image as indicated by broken lines in FIG. 20, an upper half of the trapezoidal image should be reduced horizontally while a lower half of the trapezoidal image should be expanded horizontally along a vertical axis, that is, a y axis as indicated by arrow marks.

As described hereinabove, in ordinary affine transformation, from among parameters a, b, c, d, e and f for affine transformation, the parameter relating to horizontal expansion and contraction is a. Since the parameter a is a fixed value, the ordinary affine transformation cannot be ready for the "oblique distortion" correction.

Therefore, if the parameter is rewritten into $q0 \cdot y + r0$ so that the value thereof may vary along the y axis as indicated on the lower side in FIG. 20, then the affine transformation becomes such that the expansion or contraction ratio in the horizontal direction varies linearly in response to the vertical axis. In other words, the parameter a is replaced into a function of the variable y of the y axis for "oblique distortion" correction. Here, for the "oblique distortion" correction in FIG. 20, the parameter may be a linear function, that is, a function $q0 \cdot y + r0$.

Although the affine transformation in FIG. 20 takes correction of "oblique distortion" by rotation of the pitch axis described above into consideration, it is necessary to take also correction of "oblique distortion" by rotation of the yaw axis and correction of "oblique distortion" by synthesized rotation of the pitch axis and the yaw axis into consideration.

Therefore, in the present embodiment, the concept described hereinabove with reference to FIG. 20 is expanded. In particular, in order to cause affine transformation to allow expansion or contraction in a direction perpendicular to an arbitrary axis, the parameters a, b, d and e are replaced by $pn \cdot x + qn \cdot y + rn$ (n=0, 1, 2, 3) as indicated by an (expression 7) of FIG. 21.

Here, while the affine parameters a, b, d and e participate in transformation of an image, the affine parameters c and f participate in shifting of an image in the leftward or rightward direction and the upward or downward direction, respectively. Therefore, the affine parameters c and f are not replaced into a function.

Where the affine parameters a, b, d and e are represented like the (expression 7), totaling 14 parameters are involved, and it seems that the extended affine transform is high in complicatedness. However, if the (expression 7) is expanded and put in order, then it has a form of an (expression 8) of FIG. 22 using totaling 12 parameters.

If this expression of the extended affine transformation is used, then although the expression is complicated, a solution to a plurality of local motion vectors can be derived uniquely by the least squares method. Since the technique is same as that of affine transformation, only final results are given as an (expression 9) to an (expression 13) in FIGS. 23 to 27, respectively.

It is to be noted that, while, in the present embodiment, all of the affine parameters a, b, d and e which participate in transformation of an image are replaced into a function, if the transformation of an image occurs only in a particular direction, only the parameter which relates to the direction may be replaced into a function. For example, in order to take only the transformation illustrated on the upper side in FIG. 20 into consideration, only the parameter a should be replaced into a function as illustrated on the lower side in FIG. 20.

Further, while, in the example described above, the function for replacement is a linear function because linear deformation is assumed, if curvilinear deformation is assumed, then the function may be a quadratic or higher-order function.

<Calculation of a Global Motion Using Extended Affine Transformation>

Figure 28:
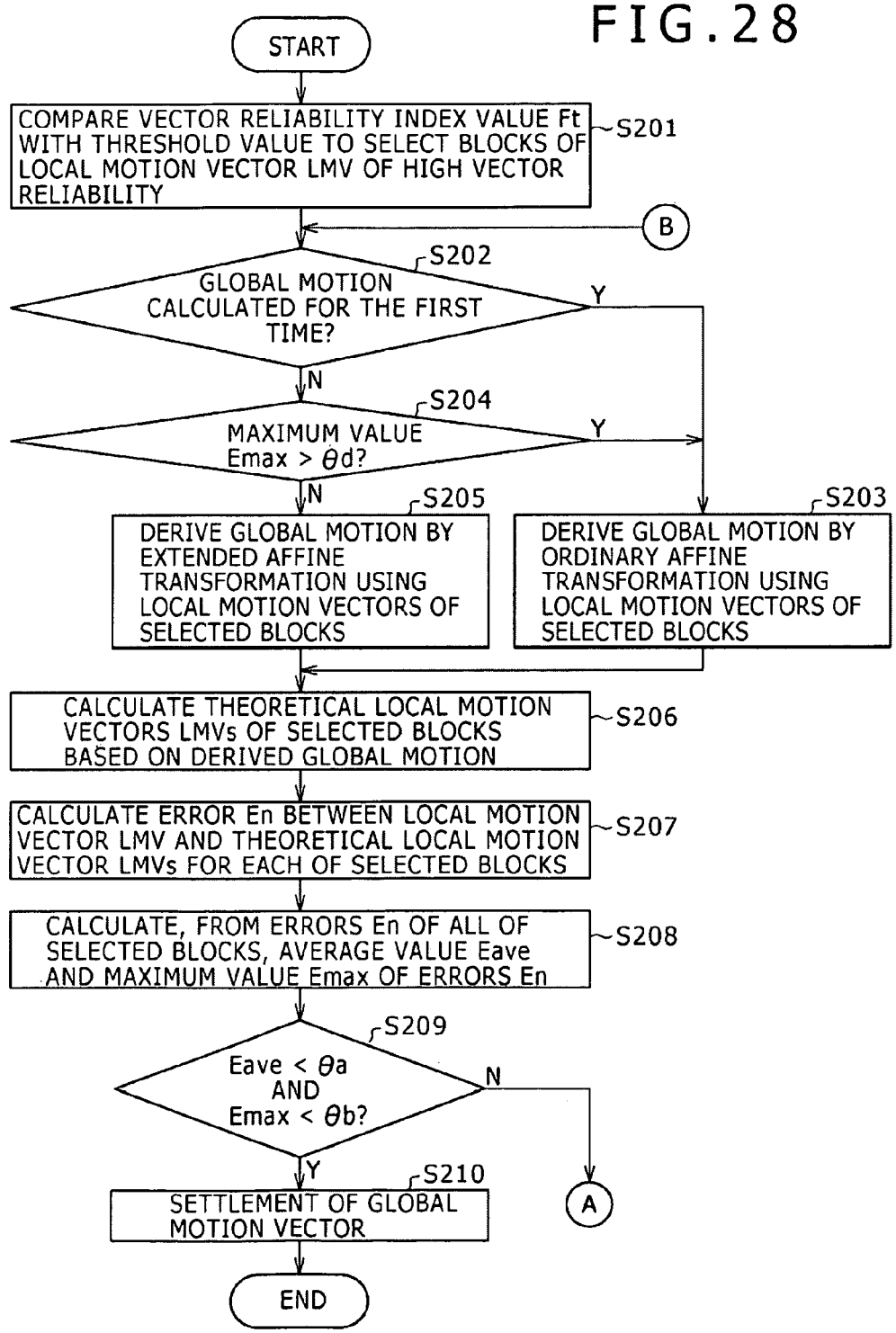
FIGS. 28 and 29 are flow charts illustrating an example of the process for calculation of a global motion from local motion vectors carried out by the image processing apparatus.
Figure 29:
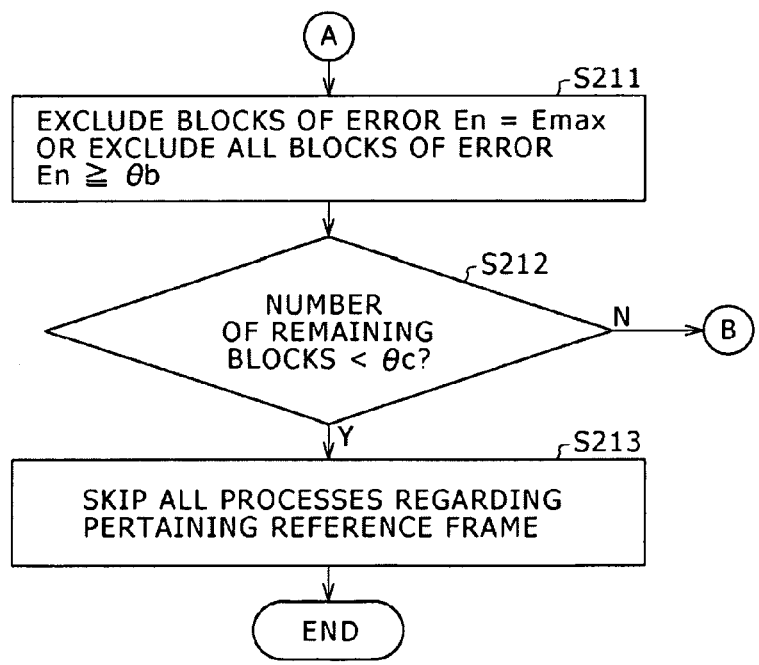

As a technique for deriving the most preferable global motion from among an unspecified large number of vectors, the present embodiment uses a method illustrated in a flow chart of FIGS. 28 and 29. According to the method, while those motion vectors of blocks which are less likely to conform to a global motion such as a moving image pickup object are excluded gradually from among blocks having high reliability, the least squares method is used to cause the parameters of the global motion to converge.

According to the process of FIGS. 28 and 29, the extended affine transformation is adopted to make it possible to exclude error vectors of an image pickup object which is moving or the like from many local motion vectors of low vector accuracy while deriving an optimum global motion including "oblique distortion" at a practical mathematical operation cost.

Incidentally, since the extended affine transformation in the present embodiment involves many transformation parameters and is flexible, there is the possibility that convergence mathematical operation of a global motion may be ready also for erroneous motion vectors of a moving image pickup object or noise, resulting in failure to exclude such erroneous motion vectors.

Therefore, in the present embodiment, at an initial stage of a convergence mathematical operation loop, exclusion of erroneous motion vectors (hereinafter referred to as error vectors) is carried out using the ordinary affine transformation, and thereafter, convergence mathematical operation using the extended affine transformation is carried out as seen from FIGS. 28 and 29. This is because it is intended to use a technique of attempting high accuracy convergence ready also for oblique distortion factors using the extended affine transformation after vector errors are reduced to such a degree that vectors of such oblique distortion factors may not be excluded by using the ordinary affine transformation.

Further, in the present embodiment, a maximum value of a vector error as a difference between a motion vector (global motion vector) determined from a global motion determined in each cycle of convergence mathematical operation and a detected motion vector (local motion vector LMV described hereinabove) is detected.

Then, if the detected maximum value of the vector error is higher than a threshold value determined in advance, then the ordinary affine transformation is continued, but if the detected maximum value of the vector error becomes lower than the predetermined threshold value, then convergence mathematical operation using the extended affine transformation is carried out.

Now, the method of FIGS. 28 and 29 is described in detail.

First at step S201, the global motion vector calculation section 157 compares motion vector reliability index values Ft of a plurality of local motion vectors LMV stored therein with a threshold value determined in advance. Then, from results of the comparison, the global motion vector calculation section 157 selects only the target blocks whose motion vector reliability index value Ft is higher than the predetermined threshold value. This process corresponds to a case wherein the two values of 1 and 0 are used for the weight coefficient W as described hereinabove with reference to the (expression 15) given hereinabove.

Then at step S202, the global motion vector calculation section 157 decides whether or not the convergence loop of convergence mathematical operation is executed for the first time. If it is decided that the convergence loop is executed for the first time, then the global motion vector calculation section 157 derives or estimates a global motion using only the selected local motion vectors LMV and using the ordinary affine transformation at step S203. In other words, the global motion vector calculation section 157 derives the affine parameters a to f of a global motion.

Then, the global motion vector calculation section 157 calculates theoretical local motion vectors LMVs of the selected blocks used for the mathematical operation based on the derived global motion at step S206.

Then at step S207, the global motion vector calculation section 157 calculates, for each of the selected blocks, an error En between the local motion vector LMV determined by the block matching process and the theoretical local motion vector LMVs determined at step S207.

For the calculation of the error between the motion vector determined by the block matching and the theoretical motion vector, if importance is attached to the accuracy in mathematical operation, then distance calculation should be carried out correctly from the Pythagorean theorem. However, if importance is attached otherwise to the lightness in mathematical operation than the accuracy, then the sum of distances determined between the two motion vectors in both of the horizontal and vertical direction may be used as an approximate distance.

Then at step S208, the global motion vector calculation section 157 uses all of the errors En determined for the selected blocks to calculate an average value Eave and a maximum value Emax of the errors En. Then at step S209, the global motion vector calculation section 157 decides whether or not the average value Eave is lower than a threshold value θa determined in advance therefor and the maximum value Emax is lower than a threshold value θb determined in advance therefor.

If it is decided at step S209 that the conditions are not satisfied, then the processing advances to step S211, at which the global motion vector calculation section 157 excludes that one of the blocks whose error En satisfies En=Emax among the errors En of the blocks determined at step S207 from the blocks to be used to derive a global motion. Or, at step S211, the global motion vector calculation section 157 detects those blocks whose error En satisfies En≧θb and excludes all of the detected blocks from the blocks to be used to derive a global motion.

Then at step S212, the global motion vector calculation section 157 decides whether or not the number of the remaining blocks as a result of the block exclusion at step S211 is lower than a threshold value θc determined in advance. If it is decided at step S212 that the number of the remaining blocks is not lower than the threshold value θc, then the processing returns to step S202 to repeat the processes at the steps beginning with step S202 setting the remaining blocks as the selected blocks.

If the number of the remaining blocks is smaller than the threshold value θc, then since an appropriate global motion cannot be obtained, the image of the object reference frame cannot be used for superposition of images in the present embodiment. Therefore, if it is decided at step S212 that the number of the remaining blocks is smaller than the threshold value θc, then the global motion vector calculation section 157 skips all later processes for the reference frame as at step S213. The global motion vector calculation section 157 ends the process of FIGS. 28 and 29 therewith.

On the other hand, if it is decided at step S202 that the convergence loop of the convergence mathematical operation is executed not for the first time, then the global motion vector calculation section 157 decides at step S204 whether or not the maximum value Emax of the errors En of the blocks determined at step S207 is higher than a threshold value θd determined in advance.

The threshold value θd is set to a value with which, when the ordinary affine transformation is used to carry out mathematical operation of a global motion and exclusion of error vectors is carried out in such a manner as at step S211 described hereinabove, vectors of oblique distortion components are not excluded.

If it is decided at step S204 that the maximum value Emax of the errors En is higher than the predetermined threshold value θd, then the global motion vector calculation section 157 advances the processing to step S203, at which it uses the ordinary affine transformation to derive a global motion. In other words, the global motion vector calculation section 157 calculates the parameters for the extended affine transformation. Thereafter, the global motion vector calculation section 157 carries out the processes at the steps beginning with step S203 described hereinabove.

If it is decided at step S204 that the maximum value Emax of the errors En is lower than the predetermined threshold value θd, then the global motion vector calculation section 157 derives a global motion using only the local motion vectors LMV of the selected blocks and using the extended affine transformation at step S205. After the process at step S205, the processes at the steps beginning with step S206 are carried out.

Then, if it is decided at step S209 of FIG. 28 that the average value Eave of the errors En is lower than the threshold value θa and the maximum value Emax of the errors En is lower than the threshold value θb, then the global motion vector calculation section 157 decides that the mathematical operation converges and finally determines the global motion to that at the point of time at step S210, whereafter the processing routine is ended.

If it to be noted that whether only that block whose error En is the maximum error Emax should be excluded or those blocks whose error En is higher than the threshold value θb should be excluded at step S211 may be determined based on the balance between the quickness of convergence and the accuracy when a global motion vector GMV is determined. If the priority is given to the accuracy, then the former method should be adopted to exclude error blocks one by one, but if the priority is given to the quickness of convergence, then the latter method may be adopted.

It is to be noted that, at step S204 in the processing routine described above, the maximum value Emax of the errors En is used for decision of changeover between the mathematical operation in which the ordinary affine transformation is used and the mathematical operation in which the extended affine transformation is used. However, the changeover decision at step S204 may be carried out taking not only the maximum value Emax of the errors En but also the average value Eave of the errors En into consideration.

In this instance, at step S204, it is decided whether or not the average value Eave of the errors En is higher than a threshold value determined in advance, and if the average value Eave is higher than the threshold value, then mathematical operation is carried out using the ordinary affine transformation, but if the average value Eave is equal to or lower than the threshold value, then mathematical operation is carried out using the extended affine transformation.

Or, it is decided at step S204 whether or not both of the maximum value Emax and the average value Eave of the errors En are higher than respective threshold values determined in advance. Then, when both of them are higher than the respective threshold values, mathematical operation is carried out using the ordinary affine transformation, but when both of them are not higher than the respective threshold values, mathematical operation is carried out using the extended affine transformation.

It is to be noted that, since a maximum value of an oblique distortion component can be obtained from a maximum camera shake amount similarly to the fact that the range of camera shake correction can be identified from an optical zoom ratio or a set shape, identification of the threshold values is comparatively easy.

The global motion vector calculation section 157 calculates a global motion vector GVM for each target block based on the global motion calculated in such a manner as described above. In particular, the global motion vector calculation section 157 uses the parameters a to l for the extended affine transformation of the calculated global motion to determine a motion vector for each target block, which corresponds to a theoretical local motion vector LMVs. For x and y in the (expression 8) of FIG. 22, the coordinate of the position of the center of each target block is used. The motion vector determined in this manner becomes the global motion vector GVM of each target block.

Then, the global motion vectors GVM of the target blocks determined in such a manner as described above are supplied to the motion compensation picture production section 16. Then, the motion compensation picture production section 16 uses the global motion vectors GVM of the target blocks to produce motion compensation pictures of the target blocks and supplies the produced motion compensation pictures to the addition section 17.

Figure 30:
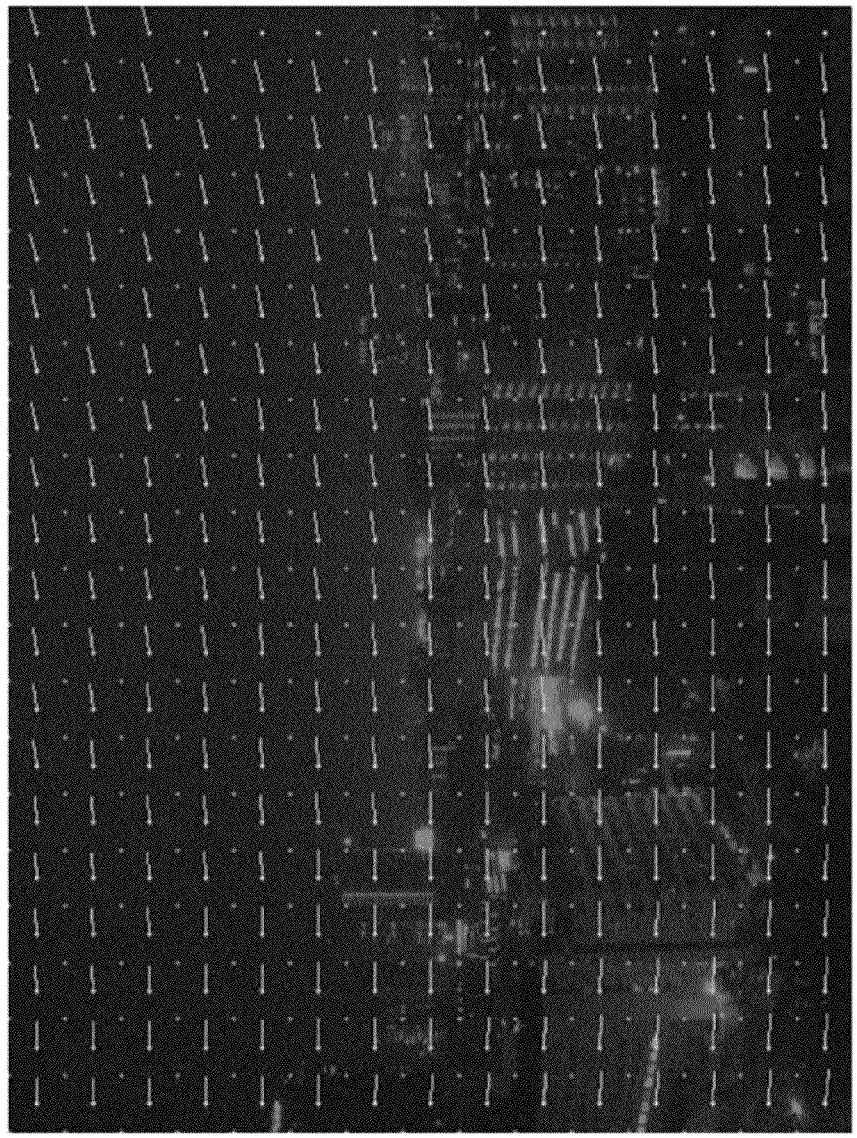
FIG. 30 is a view illustrating motion vectors of block units determined from a calculated global motion by the image processing apparatus in an associated relationship on an image.

The global motion vectors of the target blocks determined from the image of FIG. 12 which includes much noise in the present embodiment are illustrated in FIG. 30.

[Second Embodiment]

In the first embodiment described above, the local motion vector calculation block 154 carries out layered block matching to calculate a local motion vector LMV on the base plane. Then, the motion vector reliability index value calculation section 156 calculates the reliability index value Ft to the local motion vector LMV of the base plane. Further, the global motion vector calculation block 157 uses the reliability index values Ft of the local motion vectors LMV of the base plane to extract those local motion vectors LMV which have high reliability and uses the local motion vectors LMV having high reliability to calculate the global motion vector GVM.

Incidentally, by multiplying the reduction plane motion vector MVs and the intermediate plane motion vector MVm by a reciprocal number to the image reduction ratio to the base plane, the base plane motion vector MVb can be obtained. Therefore, in order to calculate the global motion vector GVM, it is possible not to determine the base plane motion vector MVb but to determine the global motion vector GVM from the reduction plane motion vector MVs or the intermediate plane motion vector MVm.

For example, in order to determine the global motion vector GVM from the reduction plane motion vector MVs, the local motion vector calculation section 154 first calculates the local motion vector LMV of the reduction plane, that is, the reduction plane motion vector MVs.

Then, the motion vector reliability index value calculation section 156 calculates the reliability index value Ft to the calculated reduction plane motion vector MVs. Further, the global motion vector calculation block 157 extracts those local motion vectors LMV having high reliability using the reliability index values Ft to the local motion vectors LMV of the reduction plane. Then, the global motion vector calculation block 157 uses the local motion vectors LMV having high reliability to calculate the global motion and the global motion vector GVM.

The determination of the global motion vector GVM using local motion vectors of the reduction plane or the intermediate plane in this manner provides the following merits.

The first merit resides in that, since a low-pass filter is applied for production of the reduction plane or the intermediate plane as described above, noise is removed, and as a result, resulting local motion vectors are less likely to be influenced by noise.

The second merit resides in that, since the number of target blocks is reduced in the reduction plane or the intermediate plane, the number of local motion vectors decreases and the mathematic operation cost decreases and besides, since the time required for the processing is reduced, the processing can be carried out at a higher speed.

The matching process block units of the reduction plane, intermediate plane and base plane normally have an equal size from restrictions of hardware as in the example described above. Therefore, the number of target blocks of the reduction plane having a small picture size, that is, the number of local vectors, relatively decreases in comparison with an alternative case wherein block matching is carried out only on the base plane.

Then, where the global motion and the global motion vector GVM are determined from reduction plane motion vectors, the motion vector detection process on the intermediate plane and the base plane can be omitted. Also in this regard, increase of the processing speed can be anticipated.

Accordingly, particularly where reduction plane motion vectors are used to determine the global motion and the global motion vector GVM, the merit is significant.

However, since the reduction plane or the intermediate plane is produced by reducing an image of the base plane, it should be taken into consideration that the accuracy of such reduction plane motion vectors or intermediate plane motion vectors is comparatively low.

Therefore, in the present embodiment, where reduction plane motion vectors or intermediate plane motion vectors are used, an interpolation process is carried out. In particular, an interpolation process is carried out using SAD values of reduction plane reference blocks or intermediate plane reference blocks in the proximity of reduction plane reference block positions or intermediate plane reference block positions indicated by calculated reduction plane motion vectors or calculated intermediate plane motion vectors and position information of the SAD values. By this interpolation process, detection of reduction plane motion vectors or intermediate plane motion vectors of the pixel accuracy is carried out. The interpolation process on the reduction plane is described below taking a reproduction process in the case of the reduction plane as an example.

For example, where block matching is carried out on a reduction plane reduced to ¼ in both of the horizontal and vertical directions, the reduction plane motion vector is a motion vector of the 4-pixel accuracy. However, it is apparent that, in the base plane reference frame, a base plane motion vector MVb of the 1-pixel accuracy exists in the proximity of a motion vector obtained by increasing the reduction plane motion vector MVs to n times.

Figure 31:
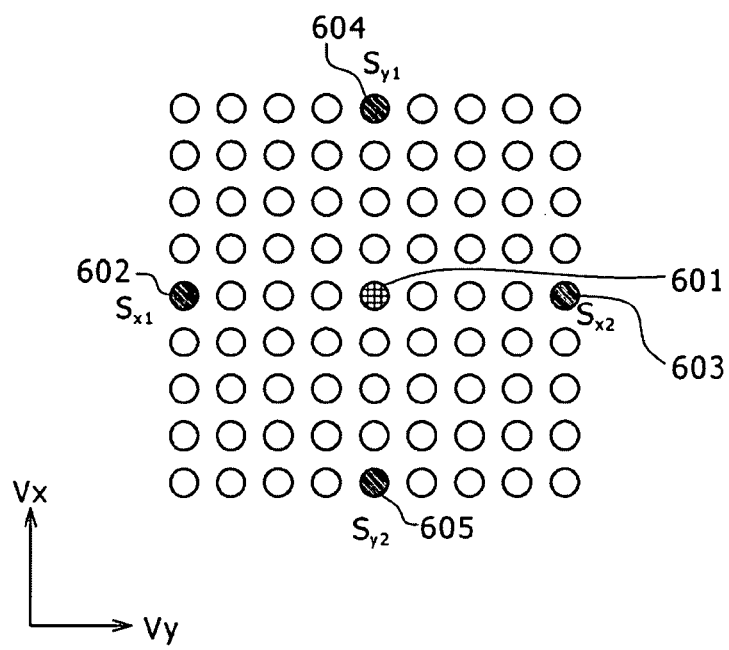
FIGS. 31 and 32 are diagrammatic views illustrating another example of processing of determining local motion vectors detected using the image processing method.

Accordingly, it is a possible idea to carry out, where the lowest SAD value 601 on the reduction plane is determined as seen in FIG. 31, an interpolation process using a plurality of SAD values in the proximity of the lowest SAD value 601, for example, using four SAD values 602, 603, 604 and 605 adjacent the lowest SAD value 601 in the upward, downward, leftward and rightward directions, respectively, to detect a motion vector of the 4-pixel accuracy. In this instance, the interpolation magnification required is four times.

For example, it is a possible idea to use a quadratic curve to carry out interpolation for the SAD table to calculate motion vectors of the pixel accuracy from the reduction plane SAD table for which a matching process has been carried out, for example, in a unit of n pixels. In this instance, although not quadratic curve approximate interpolation but linear, cubic or higher-order curve approximate interpolation may be used, in the present example, quadratic curve approximate interpolation is used from the equilibrium between the accuracy and hardware configuration.

In the present quadratic curve approximate interpolation, as seen in FIG. 31, the lowest value Smin of the SAD value in the reduction plane SAD table indicated by a reduction plane motion vector of the n-pixel accuracy and a plurality of SAD values (hereinafter referred to as neighboring reduction plane SAD values) in the proximity of the position of the lowest value Smin are used. In the present example, four neighboring SAD values Sx1, Sx2 and Sy1, Sy2 adjacent the position of the lowest value Smin in the X direction or horizontal direction and the Y direction or vertical direction, are used.

Figure 32:
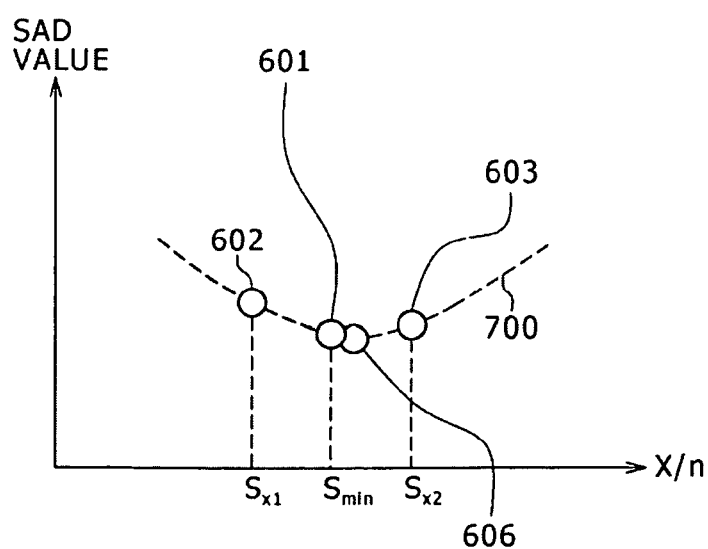

As seen in FIG. 32, the lowest value Smin of the reduction plane SAD value and the neighboring reduction plane SAD values Sx1 and Sx2 at the two adjacent points in the X direction or horizontal direction are used to apply a quadratic approximate curve 700. In particular, a quadratic approximate curve 700 which passes the minimum value Smin and the neighboring reduction plane SAD values Sx1 and Sx2 at two adjacent points in the X direction or horizontal direction is determined. By this, the coordinate at which the approximate curve 700 assumes a minimum value becomes the X coordinate Vx of the reduction plane motion vector or high-accuracy reduction plane motion vector with which the lowest value SXmin of the SAD value of the pixel accuracy is provided. The expression for the quadratic curve approximate interpolation at this time is given as the following (expression 16):

$$SXmin = \frac{1}{2} \times (Sx2-Sx1)/(Sx2-2Smin+Sx1) \quad \text{(expression 16)}$$

The X coordinate which is assumed on the SAD table by the lowest value SXmin of the SAD value of the pixel accuracy determined in accordance with the calculation expression (expression 16) becomes the X coordinate Vx at which the reduction plane SAD value of the pixel accuracy assumes the lowest value.

The division in the calculation expression (expression 16) can be implemented by subtraction executed by a plural number of times. If the pixel accuracy to be used is, for example, the accuracy of one fourth the pixel pitch of the reduction plane, then the division described above can be implemented by only two times of subtraction. Therefore, the circuit scale is small and the mathematic operation time is short, and a performance very close to that by cubic curve interpolation which is considerably more complicated than quadratic approximate curve interpolation can be implemented.

Similarly, the lowest value Smin of the reduction plane SAD value and the neighboring reduction plane SAD values Sy1 and Sy2 of two points adjacent the lowest value Smin in the Y direction or vertical direction are used to apply a quadratic approximate curve. Consequently, the Y coordinate at which the quadratic approximate curve assumes a minimum value SYmin becomes a Y coordinate Vy at which the SAD value of the pixel accuracy exhibits the lowest value. The expression for quadratic curve approximate interpolation at this time is given by the following expression (expression 17):

$$SYmin = \frac{1}{2} \times (Sy2-Sy1)/(Sy2-2Smin+Sy1) \quad \text{(expression 17)}$$

By carrying out approximation to a quadratic curve twice for the X direction and the Y direction in this manner, a reduction plane motion vector (Vx, Vy) of high accuracy, that is, of the pixel accuracy, is determined.

While, in the foregoing description, the lowest value of the reduction plane SAD value and reduction plane SAD values of two points adjacent the lowest value in the X direction or horizontal direction and the Y direction or vertical direction are used, the number of reduction plane SAD values adjacent in the different directions may be more than two. Further, in place of application of a quadratic curve in the X direction and the Y direction, an approximate curve may be applied, for example, in oblique directions. Further, an approximate curve may be applied in oblique directions in addition to the X and Y directions.

Figure 33:
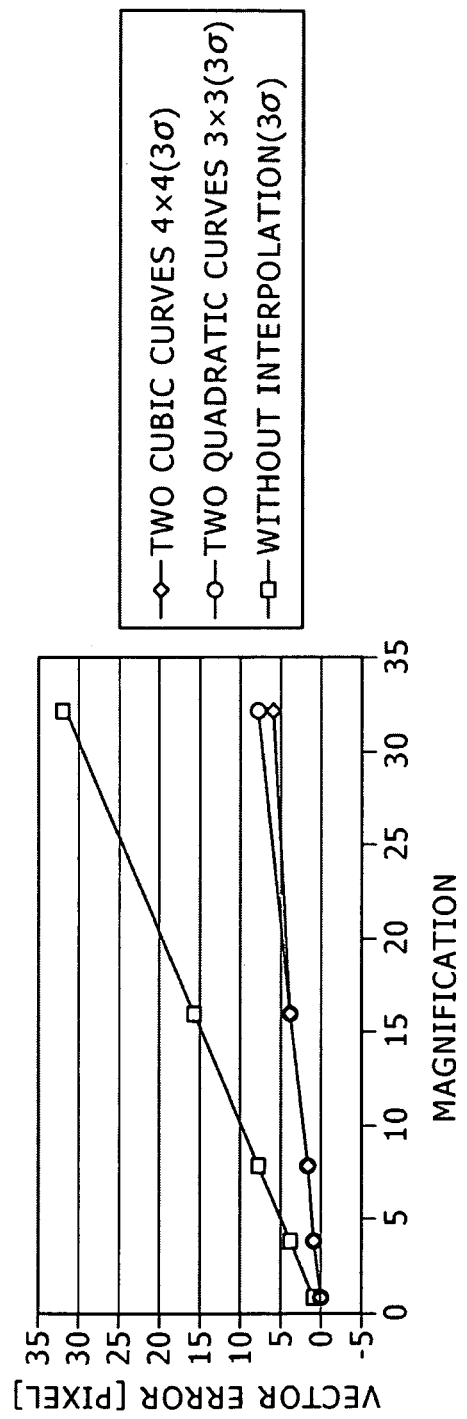
FIG. 33 is a diagrammatic view illustrating a further example of processing of determining local motion vectors detected using the image processing method.

It is illustrated in FIG. 33 that, by using such means and procedure as described above, a vector detection result of the pixel accuracy can be obtained from the values of a SAD table of the accuracy of a unit of n pixels. The axis of abscissa of FIG. 33 indicates the interpolation magnification and represents to what times the resolution should be set in a one-dimensional direction. Since the SAD table is two-dimensional, the table area decreases at a ratio of the square. However, since the error by interpolation increases only to a linear degree, the usefulness of the interpolation technique can be recognized.

[Other Embodiments and Modifications]

While, in the embodiments described above, the present application is applied to a case wherein the reliability of a motion vector detected upon image pickup of a still picture is decided, naturally the present application can be applied also to another case wherein the reliability of a motion vector detected upon image pickup of moving pictures is decided.

Further, while, in the embodiments described above, a SAD value is detected as a correlation value, naturally the correlation value is not limited to the SAD value.

Further, in the embodiments described above, a motion detection process of a still image and a superposition process of an image are carried out for a plurality of picked up images fetched in the image memory unit 4. However, a plurality of images of an image pickup object may be processed on the real time basis similarly as upon image pickup of moving pictures.

It is to be noted that image information of a detection object of a motion vector is not limited to pick up image information.

Further, in the embodiments described above, decision of the reliability of a motion vector is carried out based on a motion vector reliability index value. However, not only the difference or ratio between the first maximum value of the correlation value and the second maximum value of the correlation value but also the positional difference between the reference vector which assumes the first maximum value of the correlation value and the reference vector which assumes the second maximum value of the correlation value may be used to carry out decision of the reliability. Or, a third maximum value of the correlation value or a maximum value of a higher order or else a positional distribution of reference vectors which assume such maximum values may be further referred to to make a decision of the reliability.

It is to be noted that, in the embodiments described above, in order to reduce the mathematical operation load when a mathematical operation process of a global motion is carried out, binary values of 0 and 1 are used for the weight coefficient W corresponding to the reliability index value to a local motion vector LMV. However, the weight coefficient W obtained by normalization of a reliability index value to a local motion vector LMV and ranging from 0 to 1 may naturally be used as it is to carry out a mathematical operation process of a global motion.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus, comprising:
motion vector detection means for detecting a motion vector of each of a plurality of blocks of a predetermined size set in an image and formed from a plurality of pixels; and
global motion calculation means for carrying out convergence mathematical operation, from the motion vectors of the blocks detected by said motion vector detection means, using extended affine transformation in which at least one of affine parameters is represented by a polynomial function of a variable regarding a displacement axis of the image to calculate a global motion representative of deformation applied to the entire image, the extended affine transformation correcting oblique distortion of the image,
wherein, in initial convergence mathematical operation by said global motion calculation means, ordinary affine transformation in which the affine parameters of fixed coefficients are used is carried out from the motion vectors of the blocks detected by said motion vector detection means, and the convergence mathematical operation in which the extended affine transformation is used is started after the initial convergence mathematical operation, and
wherein said global motion calculation means includes:
correlation value calculation means for determining correlation values between target blocks corresponding to the blocks set in a target screen image and plural ones of reference blocks corresponding to the blocks set on a reference screen image different from the target screen image which are set within a search range in one of the target blocks;
means for determining the highest value of the correlation values calculated by said correlation value calculation means and a maximum value of the correlation values except the highest value;
motion vector detection means for detecting a motion vector of the target block as a displacement of the reference block, with regard to which the highest value of the correlation values is calculated, from the target block; and
means for calculating a difference between the highest value and the maximum value of the correlation values as an index to reliability of the motion vector detected by said motion vector detection means,
said global motion calculation means starting the calculation mathematical operation of the global motion using the motion vector weighted with the index to the reliability of the motion vector.

2. The image processing apparatus according to claim 1, wherein said global motion calculation means includes:
means for calculating an ideal motion vector for each of the blocks using the affine parameters used when the global motion is determined by the convergence mathematical operation using the ordinary affine transformation and then calculating the highest value and/or an average value of differences between the ideal motion vectors and the motion vectors of the blocks detected by said motion vector detection means; and
means for changing over the convergence mathematical operation to be used from the convergence mathematical operation in which the ordinary affine transformation is used to the convergence mathematical operation in which the extended affine transform is used when the highest value and/or the average of the differences become lower than a threshold value set in advance.

3. The image processing apparatus according to claim 1, wherein
said global motion calculation means includes means for deciding reliability of the motion vector using the reliability of the motion vector;
said global motion calculation means starts the initial convergence mathematical operation of the global motion using only the motion vectors whose reliability is decided to be high.

4. The image processing apparatus according to claim 1, wherein said global motion calculation means includes means for calculating an ideal motion vector for each of the blocks using the affine parameters used when the global motion is determined by the convergence mathematical operation and calculating differences between the ideal motion vectors and the motion vectors of the blocks detected by said detection means;
the convergence mathematical operation by said global motion calculation means being carried out such that a least squares method is used and repeated mathematical operation in which the mathematical operation in a next cycle is carried out after the motion vector of the block which exhibits the highest value of the differences is removed is used.

5. The image processing apparatus according to claim 4, wherein said global motion calculation means includes:
means for calculating an average value of the differences in addition to the highest value of the differences; and
means for deciding completion of convergence of the repeated mathematical operation from the highest value and the average value of the differences.

6. The image processing apparatus according to claim 5, wherein said global motion calculation means ends the calculation process of a global motion when the number of those motion vectors which remain after the removal by the repeated mathematical operation becomes lower than a value determined in advance.

7. The image processing apparatus according to claim 1, wherein said global motion calculation means includes means for calculating an ideal motion vector for each of the blocks using the affine parameters used when the global motion is determined by the convergence mathematical operation and calculating differences between the ideal motion vectors and the motion vectors of the blocks detected by said detection means;

the convergence mathematical operation by said global motion calculation means being carried out such that a least squares method is used and repeated mathematical operation in which the mathematical operation in a next cycle is carried out after the motion vectors of those blocks which exhibit a value of the difference which is higher than a threshold value determined in advance are removed is used.

8. The image processing apparatus according to claim 7, wherein said global motion calculation means includes:
means for calculating an average value of the differences in addition to the highest value of the differences; and
means for deciding completion of convergence of the repeated mathematical operation from the highest value and the average value of the differences.

9. The image processing apparatus according to claim 8, wherein said global motion calculation means ends the calculation process of a global motion when the number of those motion vectors which remain after the removal by the repeated mathematical operation becomes lower than a value determined in advance.

10. The image processing apparatus according to claim 1, wherein the detection of the motion vectors of the blocks by said motion vector detection means is carried out using a reduced image obtained by reducing the image.

11. The image processing apparatus according to claim 10, wherein said motion vector detection means carries out an interpolation process using a highest value of correlation values in the reduced image and correlation values determined from reference blocks in the proximity of the block whose correlation value is the highest value and detects the motion vectors of the blocks based on a result of the interpolation process.

12. The image processing apparatus according to claim 1, wherein the polynomial function is a linear function.

13. The image processing apparatus according to claim 1, wherein the polynomial function is a quadratic function.

14. The image processing apparatus according to claim 1, wherein the polynomial function is a higher-order polynomial function.

15. An image processing method, comprising:
a motion vector detection step of detecting a motion vector of each of a plurality of blocks of a predetermined size set in an image and formed from a plurality of pixels; and
a global motion calculation step of carrying out convergence mathematical operation, from the motion vectors of the blocks detected at the motion vector detection step, using extended affine transformation in which at least one of affine parameters is represented by a polynomial function of a variable regarding a displacement axis of the image to calculate a global motion representative of deformation applied to the entire image, the extended affine transformation correcting oblique distortion of the image,
wherein, in initial convergence mathematical operation of said global motion calculation step, ordinary affine transformation in which the affine parameters of fixed coefficients are used is carried out from the motion vectors of the blocks detected by said motion vector detection step, and the convergence mathematical operation in which the extended affine transformation is used is started after the initial convergence mathematical operation, and
wherein said global motion calculation step includes:
determining correlation values between target blocks corresponding to the blocks set in a target screen image and plural ones of reference blocks corresponding to the blocks set on a reference screen image different from the target screen image which are set within a search range in one of the target blocks;
determining the highest value of the correlation values and a maximum value of the correlation values except the highest value;
detecting a motion vector of the target block as a displacement of the reference block, with regard to which the highest value of the correlation values is calculated, from the target block;
calculating a difference between the highest value and the maximum value of the correlation values as an index to reliability of the motion vector; and
starting the calculation mathematical operation of the global motion using the motion vector weighted with the index to the reliability of the motion vector.

16. The image processing method according to claim 15, wherein the global motion calculation step includes the steps of:
calculating an ideal motion vector for each of the blocks using the affine parameters used when the global motion is determined by the convergence mathematical operation using the ordinary affine transformation and then calculating the highest value and/or an average value of differences between the ideal motion vectors and the motion vectors of the blocks detected at the motion vector detection step; and
changing over the convergence mathematical operation to be used from the convergence mathematical operation in which the ordinary affine transformation is used to the convergence mathematical operation in which the extended affine transform is used when the highest value and/or the average of the differences become lower than a threshold value set in advance.

17. The image processing method according to claim 15, wherein the polynomial function is a linear function.

18. The image processing method according to claim 15, wherein the polynomial function is a quadratic function.

19. The image processing method according to claim 15, wherein the polynomial function is a higher-order polynomial function.

20. An image processing apparatus, comprising:
a motion vector detection section configured to detect a motion vector of each of a plurality of blocks of a predetermined size set in an image and formed from a plurality of pixels; and
a global motion calculation section configured to carry out convergence mathematical operation, from the motion vectors of the blocks detected by said motion vector detection section, using extended affine transformation in which at least one of affine parameters is represented by a polynomial function of a variable regarding a displacement axis of the image to calculate a global motion representative of deformation applied to the entire image, the extended affine transformation correcting oblique distortion of the image,
wherein, in initial convergence mathematical operation by said global motion calculation section, ordinary affine transformation in which the affine parameters of fixed coefficients are used is carried out from the motion vectors of the blocks detected by said motion vector detection section, and the convergence mathematical operation in which the extended affine transformation is used is started after the initial convergence mathematical operation, and
wherein said global motion calculation section is configured to:

determine correlation values between target blocks corresponding to the blocks set in a target screen image and plural ones of reference blocks corresponding to the blocks set on a reference screen image different from the target screen image which are set within a search range in one of the target blocks;

determine the highest value of the correlation values and a maximum value of the correlation values except the highest value;

detect a motion vector of the target block as a displacement of the reference block, with regard to which the highest value of the correlation values is calculated, from the target block;

calculate a difference between the highest value and the maximum value of the correlation values as an index to reliability of the motion vector; and start the calculation mathematical operation of the global motion using the motion vector weighted with the index to the reliability of the motion vector.

21. The image processing apparatus according to claim 20, wherein the polynomial function is a linear function.

22. The image processing apparatus according to claim 20, wherein the polynomial function is a quadratic function.

23. The image processing apparatus according to claim 20, wherein the polynomial function is a higher-order polynomial function.

\* \* \* \* \*